(12) United States Patent
Lanman et al.

(10) Patent No.: US 12,551,251 B2
(45) Date of Patent: Feb. 17, 2026

(54) FIXATION ASSEMBLIES FOR MEDICAL IMPLANTS

(71) Applicant: Dynamic Spine Technology, LLC, Torrance, CA (US)

(72) Inventors: Avery Lanman, Torrance, CA (US); Sara M. Layton, Ladera Ranch, CA (US); Shawn H. Culbertson, Georgetown, TX (US); Yi Ren Chen, Sacramento, CA (US)

(73) Assignee: Dynamic Spine Technology, LLC, Torrance, CA (US)

( * ) Notice: Subject to any disclaimer, the term of this patent is extended or adjusted under 35 U.S.C. 154(b) by 524 days.

(21) Appl. No.: 17/990,337

(22) Filed: Nov. 18, 2022

(65) Prior Publication Data

US 2023/0157738 A1  May 25, 2023

Related U.S. Application Data

(60) Provisional application No. 63/281,760, filed on Nov. 22, 2021.

(51) Int. Cl.
*A61B 17/80* (2006.01)
*A61B 17/86* (2006.01)
(Continued)

(52) U.S. Cl.
CPC ........ *A61B 17/8057* (2013.01); *A61B 17/808* (2013.01); *A61B 17/863* (2013.01);
(Continued)

(58) Field of Classification Search
CPC .............. A61B 17/8057; A61B 17/808; A61B 17/8605; A61B 17/863; A61B 17/8695;
(Continued)

(56) References Cited

U.S. PATENT DOCUMENTS 3,417,802 A * 12/1968 Oldenkott ............. F16B 43/009
  411/959
6,030,162 A *  2/2000 Huebner ............ A61B 17/8863
  411/413

(Continued)

FOREIGN PATENT DOCUMENTS

JP         3223346 B2   10/2001

OTHER PUBLICATIONS

International Search Report and Written Opinion for corresponding International Appl. No. PCT/US2022/050449 mailed Mar. 21, 2023.

(Continued)

*Primary Examiner* — Marcela I. Shirsat
(74) *Attorney, Agent, or Firm* — Farber LLC

(57) ABSTRACT

Systems, devices and methods are provided for implanting medical devices into patients. The systems, devices and methods are particularly useful for orthopedic implants, such as spinal implants that facilitate fusion of bone segments. A fixation assembly for an implant comprises a screw having a head and a shaft, and a washer having at least one outer surface with one or more frictional elements for engaging a surface of the implant. The shaft includes one or more projections that cooperate with the washer to prevent the washer from sliding back down the screw, while allowing for easy application of the washer to ensure optimal placement and desired contact with the screw head. The washer and/or the screw head may also include interlocking cams that create a wedge effect that inhibits the screw from backing out or loosening from a hole in bone or other tissue.

24 Claims, 20 Drawing Sheets

(51) Int. Cl.
  *A61F 2/30* (2006.01)
  *A61F 2/46* (2006.01)

(52) U.S. Cl.
  CPC ...... *A61B 17/8695* (2013.01); *A61B 17/8605* (2013.01); *A61B 17/8625* (2013.01); *A61B 17/8665* (2013.01); *A61B 2017/867* (2013.01); *A61B 2017/868* (2013.01); *A61B 17/8685* (2013.01); *A61F 2002/30514* (2013.01); *A61F 2002/30517* (2013.01); *A61F 2/30749* (2013.01); *A61F 2002/4638* (2013.01)

(58) Field of Classification Search
  CPC . A61B 17/8042; A61B 17/86; A61B 17/8625; A61B 17/8665; A61B 17/8685; A61B 17/683; A61B 17/8033; A61B 2017/8655; A61B 2017/867; A61B 2017/868; A61F 2/30749; A61F 2/447; A61F 2002/30476; A61F 2002/30517; A61F 2002/30578; A61F 2002/30593; A61F 2002/30787; A61F 2002/30433; A61F 2002/30514; A61F 2002/4638
  USPC ....... 606/291, 300, 301, 305, 309, 310, 315, 606/316, 317, 319, 288, 290, 292, 104, 606/916
  See application file for complete search history.

(56) References Cited

U.S. PATENT DOCUMENTS

| | | | |
|---|---|---|---|
| 6,558,423 B1* | 5/2003 | Michelson | A61B 17/8875 623/17.11 |
| 2004/0068319 A1 | 4/2004 | Cordaro | |
| 2006/0079895 A1* | 4/2006 | McLeer | A61B 17/863 606/279 |
| 2007/0196195 A1* | 8/2007 | Lin | F16B 39/24 411/161 |
| 2008/0014046 A1* | 1/2008 | Bauer | F16B 43/00 411/164 |
| 2011/0313466 A1 | 12/2011 | Butler et al. | |
| 2012/0209327 A1 | 8/2012 | Chin et al. | |
| 2013/0150901 A1* | 6/2013 | Kortenbach | A61B 17/8052 606/291 |
| 2014/0026382 A1 | 1/2014 | Smith et al. | |
| 2014/0031934 A1 | 1/2014 | Trieu | |
| 2014/0257408 A1* | 9/2014 | Trieu | A61B 17/68 606/301 |
| 2016/0242820 A1 | 8/2016 | Whipple et al. | |
| 2020/0049190 A1 | 2/2020 | Hersh | |
| 2021/0085478 A1 | 3/2021 | Ehteshami et al. | |

OTHER PUBLICATIONS

Extended European Search Report for corresponding European Application No. 22896544.8 mailed Sep. 10, 2025.

\* cited by examiner

FIXATION ASSEMBLIES FOR MEDICAL IMPLANTS

CROSS-REFERENCE TO RELATED APPLICATIONS

This application claims the benefit of U.S. Provisional No. 63/281,760 filed on Nov. 22, 2021 and entitled "Fixation Assemblies for Medical Implants," the contents of which are incorporated in their entirety by reference.

FIELD

The systems, methods and devices described herein generally relate to medical implants and fixation assemblies for medical implants, and more specifically, to screw and washer assemblies for orthopedic implants that are attached to bone, such as spinal implants that facilitate the fusion of bone segments.

BACKGROUND

Medical implants have been used in the field of spine, orthopedics and dentistry for over a century, including trauma, fracture repair, reconstructive surgery and repairing or replacing damaged bone. These implants are typically used to replace a missing biological structure, support a damaged biological structure and/or to enhance an existing biological structure.

One example of such medical implants are spinal implants. The integrity of the spine, including its subcomponents like the vertebral bodies and intervertebral discs that are well known structural body parts forming the spine, are key to a patient's health. These parts may become crushed or damaged as a result of trauma or injury, or damaged by disease (e.g., by tumor, auto-immune disease) or as a result of wear over time or degeneration caused by the normal aging process.

In many instances, one or more damaged structural body parts can be repaired or replaced with a prosthesis or implant. For example, specific to the spine, one method of repair is to remove the damaged vertebra (in whole or in part) and/or the damaged disc (in whole or in part) and replace it with an implant or prosthesis. In some cases, it is necessary to stabilize a weakened or damaged spinal region by reducing or inhibiting mobility in the area to avoid further progression of the damage and/or to reduce or alleviate pain caused by the damage or injury. In other cases, it is desirable to join together the damaged vertebrae and/or induce healing of the vertebrae. Accordingly, an implant or prosthesis may be configured to facilitate fusion between two adjacent vertebrae. The implant or prosthesis may be placed without attachment means or fastened in position between adjacent structural body parts (e.g., adjacent vertebral bodies).

Typically, an implant or prosthesis is secured directly to a bone structure by mechanical or biological means. One manner of spine repair involves attaching a fusion implant or prosthesis to adjacent vertebral bodies using a fixation element, such as a screw. Most implants and their attachment means are configured to provide an immediate, rigid fixation of the implant to the implantation site.

Unfortunately, in some cases, after implantation the implants tend to subside, or settle, into the surrounding environment as the patient's weight is exerted upon the implant. In some cases, this subsidence may cause the rigidly fixed attachment means to either loosen, dislodge or potentially damage one or more of the vertebral bodies. In addition, compressive forces on the bone screws may cause the screws to move or toggle relative to the implant. If the screws move or toggle too much or for too long a period of time, this undesired movement can cause the screws to fracture, potentially causing pieces of the screw to break off within the patient and/or causing the implant to dislodge from the bone.

Furthermore, after insertion into the vertebral body, the fixation element or bone screw has a tendency to work itself loose and/or completely "back out" of the underlying bone. This problem is particularly relevant in areas of high stress, such as the spine. The consequence of fixation elements backing out or loosening includes improper or incomplete fusion, loss of stability, potential risk to the patient, and a separate costly and often painful revision surgery.

It is therefore desirable to provide an implant and associated fixation elements that can account for subsidence and/or compression forces that occurs to implants subsequent to implantation to inhibit the screws from toggling relative to the implant. In addition it is desirable to provide fixation elements that avoid the problem of screw loosening or backing out over time and with use.

SUMMARY

The following presents a simplified summary in order to provide a basic understanding of some aspects of the present systems, methods and devices. This summary is not an extensive overview of the claimed subject matter. It is intended to neither identify key or critical elements of the claimed subject matter nor delineate the scope of the claimed subject matter. Its sole purpose is to present some concepts of the present systems, methods and devices in a simplified form as a prelude to the more detailed description that is presented later.

Systems, methods and devices are provided for implanting medical devices into patients. The systems and devices may include fixation elements, such as screw and washer assemblies, and implants that include such fixation elements. The systems, devices and methods are particularly useful for orthopedic implants that are attached to bone, such as spinal implants that facilitate fusion of bone segments. Although the following discussion focuses on spinal implants or prostheses, it will be appreciated that many of the principles may equally be applied to other structural body parts within a human or animal body.

The fixation assemblies described herein generally comprise a screw having a head and a shaft, and a washer having at least one outer surface with one or more frictional elements for engaging a surface of the implant. The shaft includes one or more projections that cooperate with the washer to prevent the washer from sliding back down the screw, while allowing for easy application of the washer to ensure optimal placement and desired contact with the screw head. The washer and/or the screw head may also include interlocking cams that create a wedge effect that inhibits the screw from backing out or loosening from a hole in bone or other tissue.

In one aspect, a fixation assembly for an implant comprises a screw having a head, a shaft with a threaded portion and a shank portion between the threaded portion and the head. The shaft comprises one or more projections extending from the shank portion. The fixation assembly further includes a washer having at least one outer surface with one or more frictional elements for engaging a surface of the implant. The washer defines upper and lower surfaces and a central opening. The central opening of the washer has a cross-sectional area at the upper surface that is smaller than the combined cross-sectional area of the projections and the shank, while the central opening at the lower surface has a cross-sectional area that is greater than the combined cross-sectional area of the projections and the shank. This allows the operator to manipulate the washer to advance it proximally over the projections to the screw head, while preventing the washer from sliding back down the screw.

In one embodiment, the opening at the upper surface of the washer has a diameter and the opening at the lower surface has at least one dimension greater than the diameter. This dimension may, for example, be a distance from one side of the opening to the other side of the opening.

In certain embodiments, the internal perimeter of the washer opening is substantially circular at the upper surface, whereas the internal perimeter of the washer opening is non-circular at the lower surface. The lower surface may have a first portion with a first width and a second portion with a second width smaller than the first width.

The projections on the shank may comprise extrusions, bumps, threads, or any other type of projection that extends from the shank. In some embodiments, the projections are frictional elements, such as surface roughening and the like. In an exemplary embodiment, the projections comprise extrusions that have been formed into a spiral formation around shank.

In one embodiment, the screw head includes a plurality of cams or other locking elements disposed on a lower surface facing the shaft. The washer includes a plurality of cams or other locking elements configured to interlock with the cams of the screw. The cams may have an angle of inclination that is greater than the pitch angle of the threaded portion of the shaft. This creates a wedge effect that inhibits the screw from backing out or loosening from a hole in bone or other tissue. The interlocked cams make it extremely difficult for dynamic loads of physiological forces to release the cams, which ensures that the washer remains fixed to the implant and the screw head after the implant has been secured within a patient.

The angle of inclination of the cams will depend on the pitch angle of the threads on the screw shaft. In certain applications, this cam inclination angle may be greater than 5 degrees. This angle may be greater than 10 degrees. The cam inclination angle may be about 11 degrees.

The threaded portion of the shaft may include an upper part near the head and a lower part near the tip. The upper and lower parts may have a different thread pitch. In certain embodiments, the upper part has a lower thread pitch than the threads of the lower part. The higher thread pitch towards the tip of the screw allows for greater purchase into, for example, cancellous bone, while the lower thread pitch towards the head of the screw increases the holding power of the screw. In addition, this lower thread pitch provides a smaller pitch angle that works in tandem with the larger cam inclination angle of the interlocked cams.

The upper surface of the washer may have an outer dimension substantially equal to, or greater than, the outer dimension of the screw head. This increases the surface area of contact between the washer and the implant to distribute the load against the screw over a larger area, which increases the fixation between the screw and bone or other tissue in the patient.

The screw head may have any shape suitable for the intended procedure, such as cylindrical, conical, square, rectangular and the like. The screw head may include a mating feature for receiving a driving instrument to advance the screw into bone or other tissue. In some embodiments, the mating feature will be configured to resist stripping and may be star-shaped (e.g., torx) or the like.

The screw may be cannulated or non-cannulated, self-tapping and self-drilling and may be of a bone-screw type, such as those well known to skilled artisans. In some embodiments, the screw may include cutting notches near, or at, the distal tip, or cement holes along the shaft, to facilitate self-tapping. The implant may, for example, comprise an orthopedic implant, such as a spinal implant configured to facilitate fusion of bone segments.

In another aspect, a medical implant assembly comprises an implantable body having an upper surface, a lower surface and one or more through holes. The assembly further includes one or more bone screws, each having a head and a shaft with a threaded portion configured to pass through the through holes to attach the implantable body to bone. The shaft comprises one or more projections extending from a shank portion between the head and shaft. The assembly further includes a washer having at least one outer surface with one or more frictional elements for engaging a surface of the implant. The washer defines upper and lower surfaces and a central opening. The opening at the upper surface has a cross-sectional area smaller than the combined cross-sectional area of the projections and the shank and the opening at the lower surface has a cross-sectional area greater than the combined cross-sectional area of the projections and the shank. This prevents the washer from sliding back down the screw and allows for the easy application or removal of the washer while ensuring optimal placement and desired contact with the screw head.

The implantable body may be configured for insertion between vertebral bodies of a patient's spine. The spinal implant may have an upper surface, a lower surface, an anterior portion, a posterior portion and one or more apertures within the posterior portion for receiving at least one bone screw.

In another aspect, a method of securing a fixation assembly to an implantable body comprises providing a screw having a head, a shaft with a threaded portion, and a shank between the head and the shaft having one or more projections extending therefrom. A washer is advanced over the shaft of the screw to the shank portion. The washer is then toggled, shifted, rotated, adjusted or otherwise manipulated to allow the operator to advance the washer distally past the projections to the screw head. The washer may then be manipulated such that it will not slip proximally past the projections proximally.

In certain embodiments, the washer is manipulated by shifting, adjusting or rotating it relative to the shaft. In one such embodiment, the washer is rotated around the longitudinal axis of the shaft. In another embodiment, the washer is shifted, toggled and/or rotated around an axis substantially perpendicular to the shaft (e.g. by moving one side of the washer proximally while maintaining the position of the other side of the washer). In yet another embodiment, the washer is adjusted, manipulated and/or rotated about multiple axes.

In certain embodiments, the washer comprises an upper surface with a plurality of cams disposed thereon. The method further comprises aligning the cams of the washer with cams of the screw head and rotating the washer relative to the screw head to interlock the cams of the washer with the cams of the screw head.

The method may further comprise aligning visual indicators on the cams of the washer and the screw head with each other to ensure that the appropriate patterned threads are engaged to lock the washer to the bone screw. The visual indicators may comprise markings, colors, letters, surface features or the like.

The washer may be rotated until one or more frictional elements on an outer surface of the washer engage a lower surface of the head facing the shaft. The frictional elements provide additional frictional resistance between the washer and the screw head.

The method may further comprise inserting the threaded portion of the shaft through a through hole in the implant and driving the screw into bone to secure the implant to the bone. The shaft may be rotated until one or more frictional elements on a lower surface of the washer contact the implant.

The implant may, for example, comprise a spinal implant, such as an interbody fusion device. The method may further comprise inserting the implantable body between vertebral bodies of a patient's spine and driving at least the threaded portion of the screw through the through hole to attach the implantable body to the vertebral bodies.

In another aspect, a fixation assembly for an implant comprises a screw having a head and a shaft with a threaded portion, and a washer having an inner surface with internal threads and at least one outer surface with one or more frictional elements, such as serrations or other surface features, for contacting a surface of the implant. The shaft comprises external threads on a shank portion between the threaded portion and the head. The external threads mate with the internal threads of the washer to secure the washer to the screw. This prevents the washer from sliding back down the screw and allows for the easy application or removal of the washer while ensuring optimal placement and desired contact with the screw head.

In one embodiment, the screw head includes a plurality of cams or other locking elements disposed on a lower surface facing the shaft. The washer includes a plurality of cams or other locking elements configured to interlock with the cams of the screw. The cams may have an angle of inclination that is greater than the pitch angle of the threaded portion of the shaft. This creates a wedge effect that inhibits the screw from backing out or loosening from a hole in bone or other tissue. The interlocked cams make it extremely difficult for dynamic loads of physiological forces to release the cams, which ensures that the washer remains fixed to the implant and the screw head after the implant has been secured within a patient.

The angle of inclination of the cams will depend on the pitch angle of the threads on the screw shaft. In certain applications, this cam inclination angle may be greater than 5 degrees. This angle may be greater than 10 degrees. The cam inclination angle may be about 11 degrees.

In another embodiment, the washer comprises first and second washer portions configured to align with each other. The washer portions each have an inner surface with a plurality of cams disposed thereon. The cams of the first washer portion are configured to interlock with the cams of the second washer portion. The first and second washer cams have an angle of inclination that is greater than the pitch angle of the threaded portion of the shaft.

The first or upper washer portions may comprise one or more frictional elements, such as serrations or other surface features, on an outer surface. The serrations are positioned to contact and engage a lower surface of the screw head after the washer has been threaded onto the shaft. The serrations provide resistance to movement between the washer and the screw head.

The threaded portion of the shaft may include an upper part near the head and a lower part near the tip. The upper and lower parts may have a different thread pitch. In certain embodiments, the upper part has a lower thread pitch than the threads of the lower part. The higher thread pitch towards the tip of the screw allows for greater purchase into, for example, cancellous bone, while the lower thread pitch towards the head of the screw increases the holding power of the screw. In addition, this lower thread pitch provides a smaller pitch angle that works in tandem with the larger cam inclination angle of the interlocked cams.

The washer may have an outer dimension substantially equal to, or greater than, the outer dimension of the screw head. This increases the surface area of contact between the washer and the implant to distribute the load against the screw over a larger area, which increases the fixation between the screw and bone or other tissue in the patient.

The screw head may have any shape suitable for the intended procedure, such as cylindrical, conical, square, rectangular and the like. The screw head may include a mating feature for receiving a driving instrument to advance the screw into bone or other tissue. In some embodiments, the mating feature will be configured to resist stripping and may be star-shaped (e.g., torx) or the like.

The screw may be self-tapping and self-drilling and may be of a bone-screw type, such as those well known to skilled artisans. The implant may, for example, comprise an orthopedic implant, such as a spinal implant configured to facilitate fusion of bone segments.

In another aspect, a medical implant assembly comprises an implantable body having an upper surface, a lower surface and one or more through holes. The assembly further includes one or more bone screws, each having a head and a shaft with a threaded portion configured to pass through the through holes to attach the implantable body to bone. The assembly further includes a washer having an inner surface with internal threads and at least one outer surface with one or more frictional elements for engaging a surface of the implantable body. The screw shaft comprises external threads on a shank portion between the threaded portion and the head. The external threads are configured to mate with the internal threads of the washer to secure the washer to the screw.

In one embodiment, the screw head includes a plurality of cams or other locking elements disposed on a lower surface facing the shaft. The washer includes a plurality of cams or other locking elements configured to interlock with the cams of the screw. The cams may have an angle of inclination that is greater than the pitch angle of the threaded portion of the shaft. This creates a wedge effect that inhibits the screw from backing out or loosening from a hole in bone or other tissue. The interlocked cams make it extremely difficult for dynamic loads of physiological forces to release the cams, which ensures that the washer remains fixed to the implant and the screw head after the implant has been secured within a patient.

The angle of inclination of the cams will depend on the pitch angle of the threads on the screw shaft. This cam inclination angle may be greater than 5 degrees. This angle may be greater than 10 degrees. The cam inclination angle may be about 11 degrees.

In another embodiment, the washer comprises first and second washer portions configured to align with each other. The washer portions each have an inner surface with a plurality of cams disposed thereon. The cams of the first washer portion are configured to interlock with the cams of the second washer portion. The first and second washer cams have an angle of inclination that is greater than the pitch angle of the threaded portion of the shaft.

The first or upper washer portion may comprise one or more frictional elements, such as serrations, on an outer surface. The serrations are positioned to contact and engage a lower surface of the screw head after the washer has been threaded onto the shaft. The serrations provide resistance to movement between the washer and the screw head.

The threaded portion of the shaft may include an upper part near the head and a lower part near the tip. The upper and lower parts may have a different thread pitch. In certain embodiments, the upper part has a lower thread pitch than the threads of the lower part. The higher thread pitch towards the tip of the screw allows for greater purchase into, for example, cancellous bone, while the lower thread pitch towards the head of the screw increases the holding power of the screw. In addition, this lower thread pitch provides a smaller pitch angle that works in tandem with the larger cam inclination angle of the interlocked cams.

The implantable body may be configured for insertion between vertebral bodies of a patient's spine. The spinal implant may have an upper surface, a lower surface, an anterior portion, a posterior portion and one or more apertures within the posterior portion for receiving at least one bone screw.

In another aspect, a method of securing a fixation assembly to an implantable body comprises providing a screw having a head and a shaft with a threaded portion, and a washer having an inner surface with internal threads. The washer is advanced over the shaft of the screw to a shank portion of the screw between the threaded portion and the head. The internal threads of the washer are aligned with external threads on the shank portion of the screw shaft. The washer is rotated relative to the screw such that the internal threads of the washer engage the external threads of the screw shaft and translate the washer towards the head of the screw.

In certain embodiments, the washer comprises first and second washer portions each having an inner surface with a plurality of cams disposed thereon. The method further comprises aligning the cams of the first washer portion with the cams of the second washer portion and rotating the first washer relative to the second washer to interlock the cams of the first washer with the cams of the second washer.

The method may further comprise aligning visual indicators on the cams of the first and second washer portions with each other to ensure that the appropriate patterned threads are engaged to lock the washer to the bone screw. The visual indicators may comprise markings, colors, letters, surface features or the like.

The washer may be rotated until one or more frictional elements on an outer surface of the washer engage a lower surface of the head facing the shaft. The frictional elements provide additional frictional resistance between the washer and the screw head.

The method may further comprise inserting the threaded portion of the shaft through a through hole in the implant and driving the screw into bone to secure the implant to the bone. The shaft may be rotated until one or more frictional elements on a lower surface of the washer contact the implant.

The implant may, for example, comprise a spinal implant, such as an interbody fusion device. The method may further comprise inserting the implantable body between vertebral bodies of a patient's spine and driving at least the threaded portion of the screw through the through hole to attach the implantable body to the vertebral bodies.

It is to be understood that both the foregoing general description and the following detailed description are exemplary and explanatory only and are not restrictive of the disclosure. Additional features of the present systems, methods and devices will be set forth in part in the description which follows or may be learned by practice of the disclosure.

BRIEF DESCRIPTION OF THE DRAWINGS

The accompanying drawings, which are incorporated in and constitute a part of this specification, illustrate several embodiments of the present systems, methods and devices, and together with the description serve to explain the principles of the disclosure.

DETAILED DESCRIPTION

Systems, devices and methods are provided for implanting medical devices into patients. The systems and devices may include fixation elements, such as screw and washer assemblies, and implants that include such fixation elements. The systems, devices and methods are particularly useful for orthopedic implants that are attached to bone, such as spinal implants that facilitate fusion of bone segments.

While the following disclosure is presented with respect to spinal implants for fusion procedures, it should be understood that the features of the presently described devices may be readily adapted for use in any type of medical implant that must be attached to bone, such as an orthopedic implant, a dental implant, an artificial spinal disc, a total or partial joint replacement or repair device, trauma repair device, bone fracture repair device, reconstructive surgical device, alveolar ridge reconstruction device, veterinary implant or the like.

Figure 1:
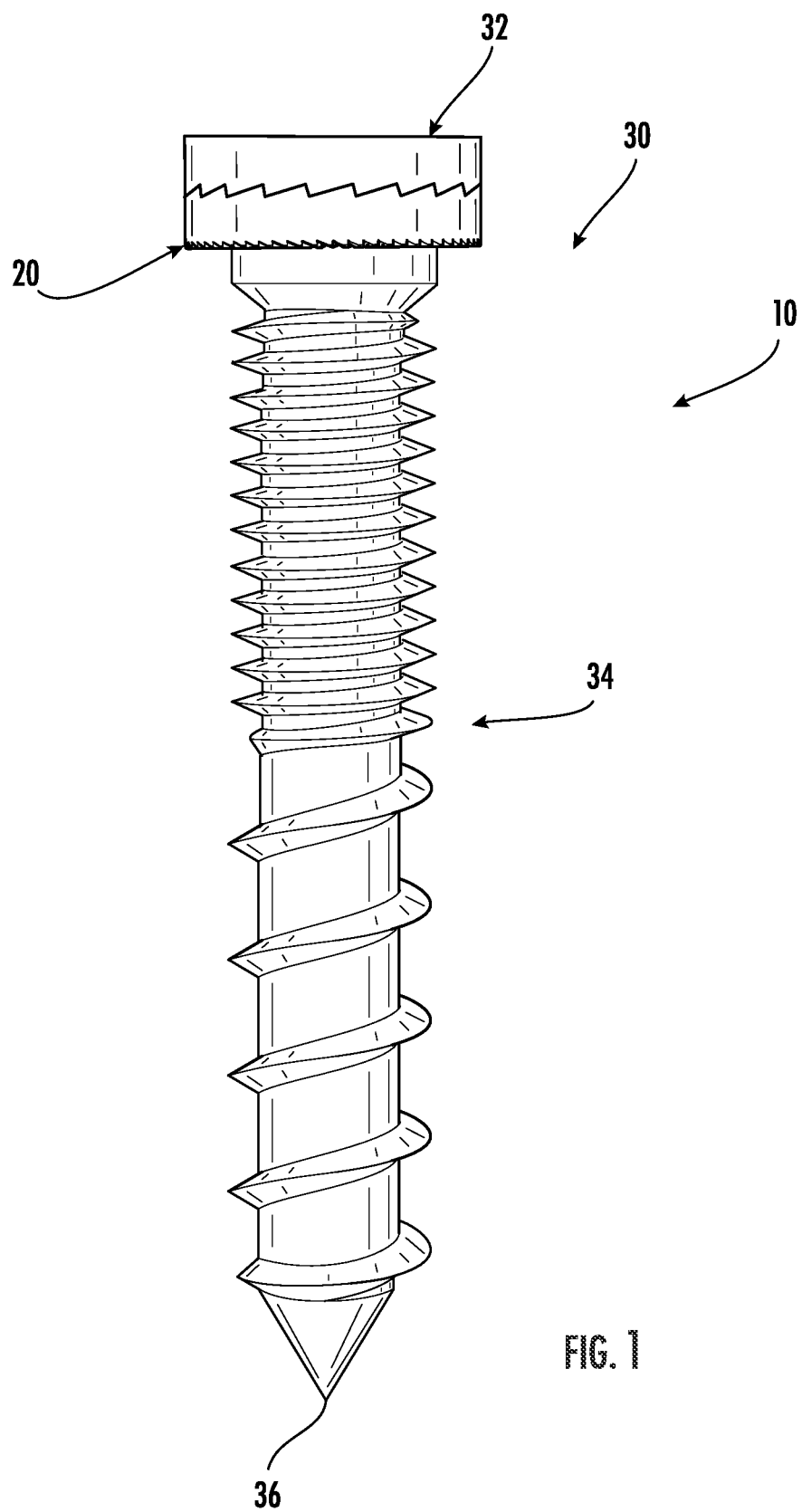
FIG. 1 is a side view of a fixation assembly.
Figure 2:
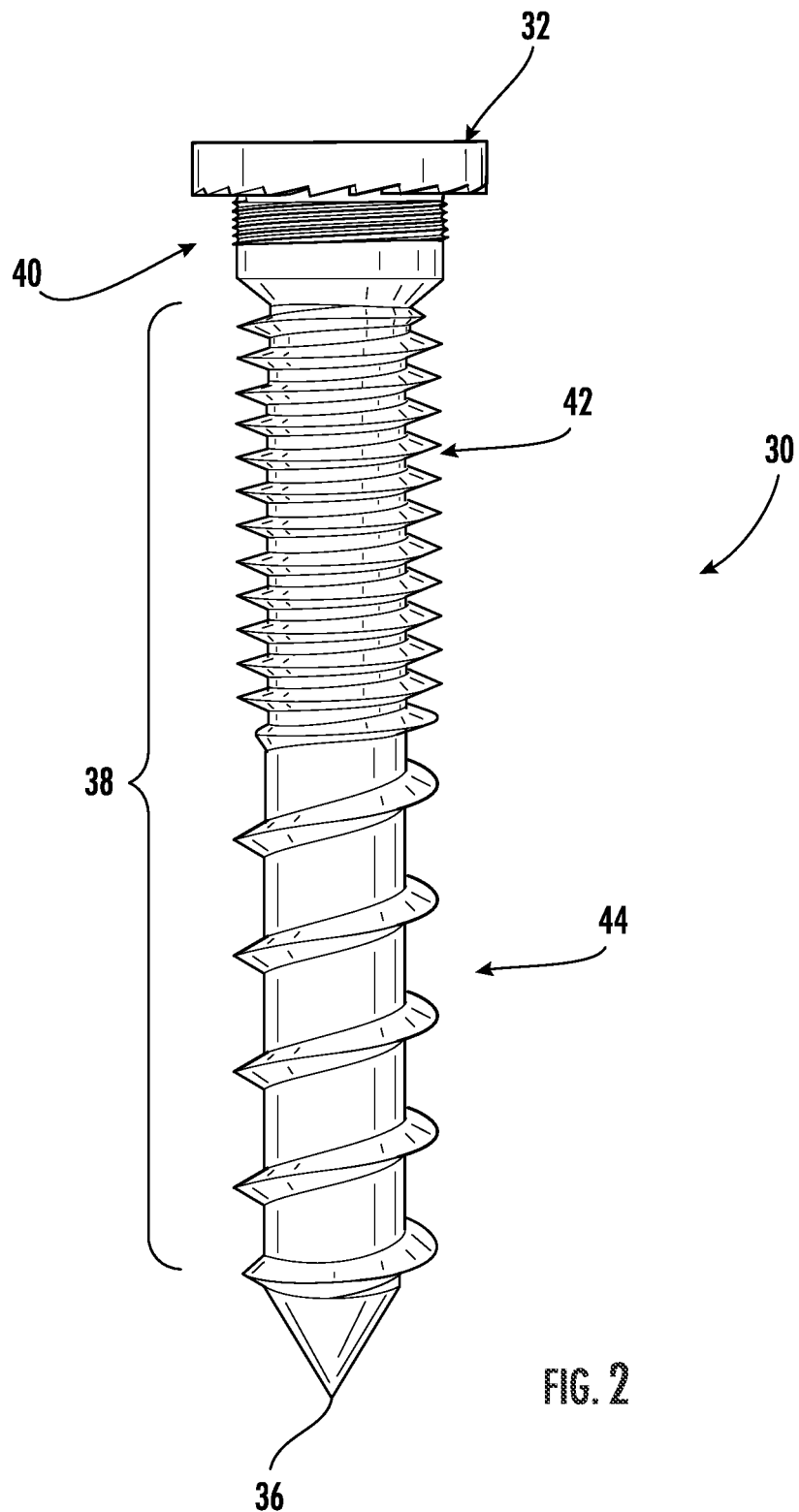
FIG. 2 is a side view of a screw of the fixation assembly of FIG. 1.
Figure 3:
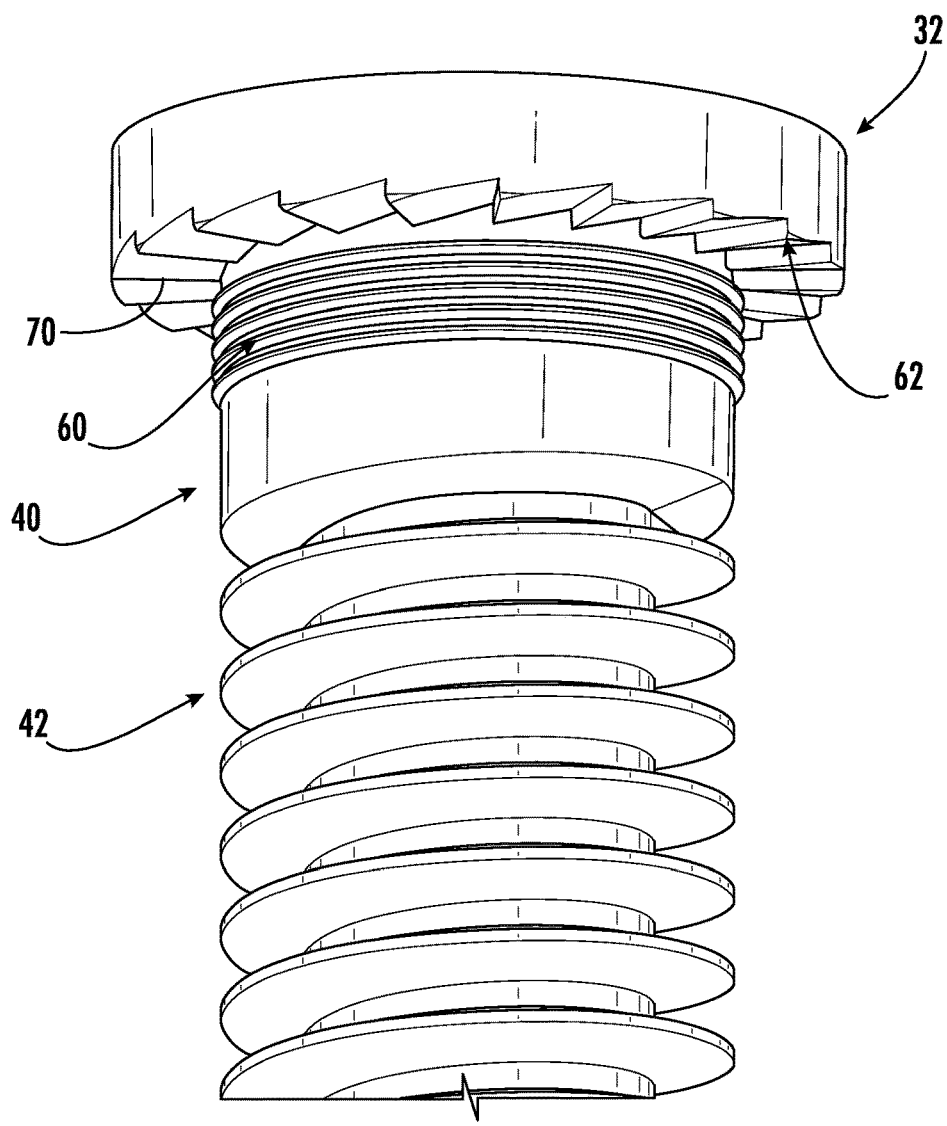
FIG. 3 is a close-up view of an upper portion of the screw of FIG. 2.

Referring now to FIGS. 1-6, a fixation assembly 10 comprises a washer 20 coupled to a fixation screw 30. Fixation screw 30 comprises a head 32 and a shaft 34 with a distal tip 36. Shaft 34 includes a threaded portion 38 and a shank portion 40 between threaded portion 38 and head 32 (see FIG. 2). Fixation screw 30 may be self-tapping and self-drilling and may be of a bone-screw type, such as those well known to skilled artisans. As shown in FIG. 3, head 32 may further include a plurality of cams 70 on a lower surface 62 of head 32 that are configured to interlock with corresponding cams 80 on washer 20 (see FIG. 6).

Fixation assembly 10 and its components may be formed of any suitable medical grade material, such as biocompatible metals like stainless steel, titanium, titanium alloys, etc. or a medical grade plastic such as polyetheretherketone (PEEK) or another radiolucent material, ultra high molecular weight polyethylene (UHMWPE), etc. If so desired, the fixation assembly 10 may also be formed of a bioresorbable material. The bioresorbable material may preferably be osteoconductive or osteoinductive (or both).

Referring again to FIG. 2, threaded portion 38 may include an upper portion 42 near head 32 and a lower portion 44 near tip 36. Upper threaded portion 42 preferably comprises about 20% to about 75% of the total length of threaded portion 38, preferably about 25% to about 50%. The threads in upper and lower portions 42, 44 preferably extend outward about the same distance from shaft 34, although their outer dimensions may differ depending on the application. In one embodiment, the threads extend outward from shaft 34 by about 0.5 mm to 1.5 mm, or about 0.75 mm to about 0.85 mm (see FIG. 5).

Upper portion 42 preferably has a lower thread pitch (i.e., the distance between threads) than lower portion 44. The ratio of lower thread pitch to higher thread pitch may be about 1:2 to about 1:5, preferably about 1:3 to 1:4 (e.g., about 1:3.5). In certain embodiments, the distance between threads in upper portion 42 is about 0.5 mm to about 1.0 mm, preferably about 0.8 mm and the distance between threads in lower portion 44 is about 2.0 mm to about 4.0 mm, preferably about 2.5 mm to about 3.0 mm (e.g., 2.75 mm). The higher thread pitch towards tip 36 of the screw allows for a greater purchase into cancellous bone, while the lower thread pitch towards head 32 increases the holding power of the screw. In addition, the lower thread pitch of upper portion 42 provides for a smaller wedge angle for the threads (i.e., the angle that the thread make with a horizontal plane passing perpendicular to the longitudinal axis of the screw). This provides additional advantages in tandem with the larger cam angle created by the interlocking cams 70, 80 of washer 20 and screw head 32 (discussed below).

Of course, the devices disclosed herein are not limited to the thread pitch configuration described above. For example threaded portion 38 may also have a single, substantially uniform thread pitch throughout its length. Alternatively, threaded portion 38 may have more than two different thread pitches. In some embodiments, the thread pitches of upper portion 42 and lower portion 44 may be reversed such that upper portion 42 has a higher thread pitch than lower portion 44.

Figure 5:
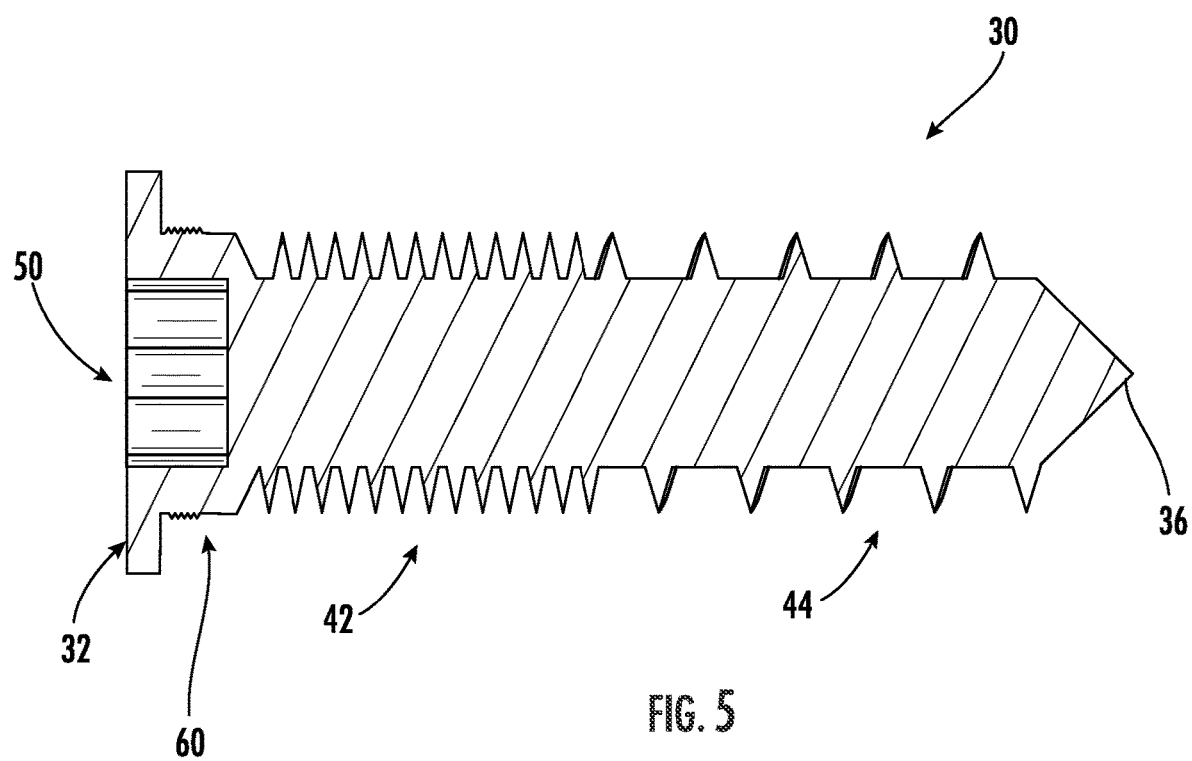
FIG. 5 is a cross-sectional view of the screw of FIG. 2.

Referring now to FIGS. 3 and 5, shank portion 40 extends from the upper part of threaded portion 42 and head 32 of fixation screw 20. Shank portion 40 includes external threads 60 that extend adjacent to, or near, a lower surface 62 of head 30. Threads 60 are configured to mate with internal threads 75 of washer 20 (shown in FIG. 6 and discussed below). Threads 60 preferably have a lower thread pitch than upper threaded portion 42. The ratio of thread pitch between threads 60 and the threads of upper portion may be about 1:2 to about 1:10, preferably about 1:3 to about 1:5 (e.g., 1:4). In certain embodiments, the distance between threads 60 is about 0.1 mm to about 0.4 mm, preferably between about 0.15 mm to about 0.25 mm (e.g., 0.2 mm).

In other embodiments, external threads 60 has substantially the same thread pitch as threaded portion 38 of screw shaft 32. Alternatively, external threads 60 may have a higher thread pitch.

Figure 6:
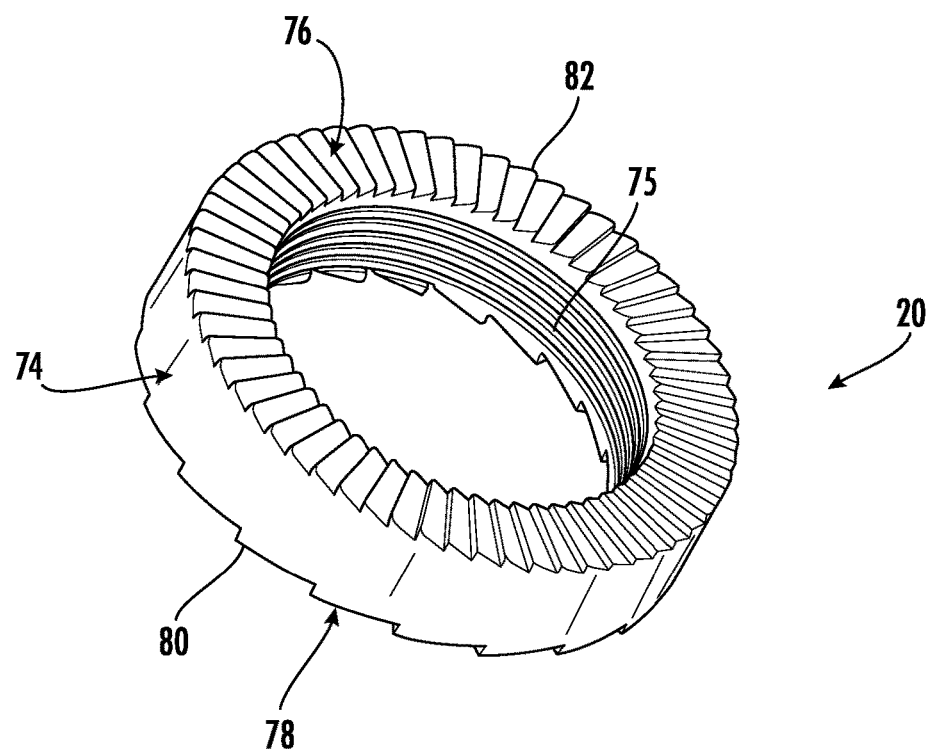
FIG. 6 is a perspective view of a washer of the fixation assembly of FIG. 1.
Figure 7:
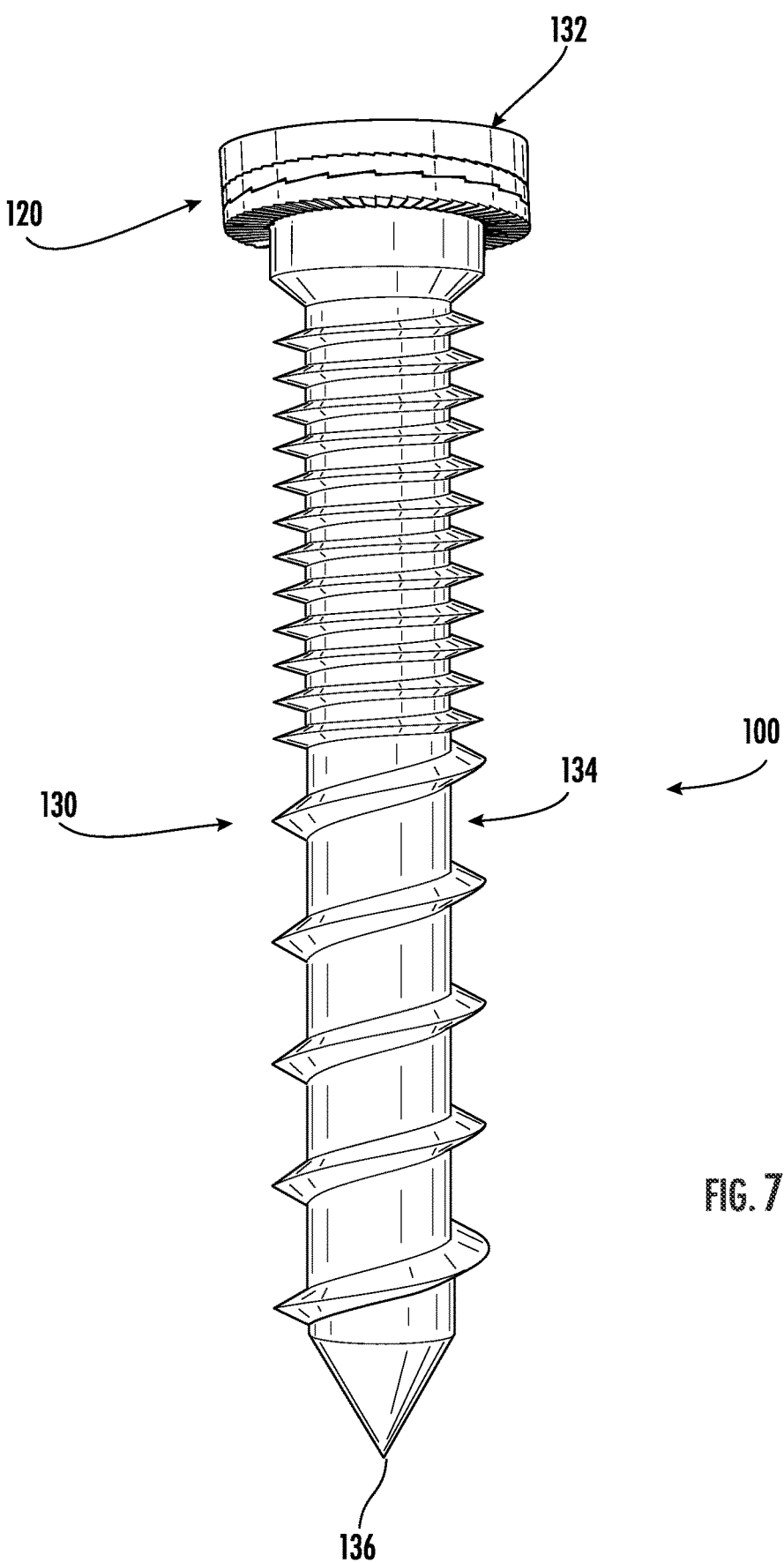
FIG. 7 is a side view of another embodiment of a fixation assembly.
Figure 8:
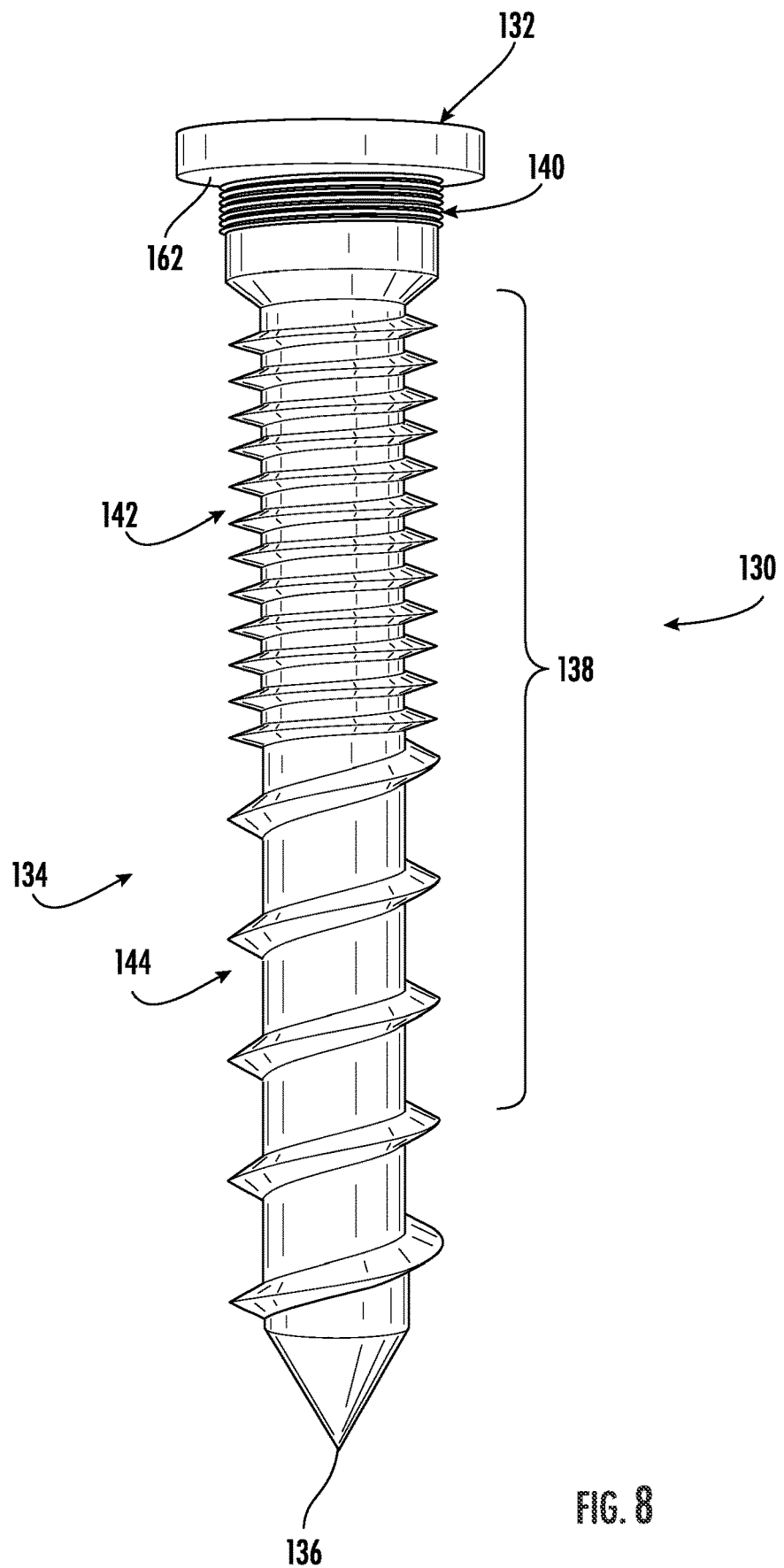
FIG. 8 is a side view of a screw of the fixation assembly of FIG. 7.

Referring now to FIG. 6, washer 20 may have a substantially annular shape with an inner diameter sized to fit over shaft 34 and fit against head 32 to minimize loosening of screw 30. In certain embodiments, washer 20 may have an enlarged outer diameter, thereby increasing the surface area of contact to distribute the load from screw 30 over a larger area. In an exemplary embodiment, washer 20 has an outer diameter substantially equal to the outer diameter of head 32. In other embodiments, washer 20 have may have a larger outer diameter than head 32.

Washer 20 includes an inner surface having internal threads 75, an outer surface 74 and upper and lower surfaces 76, 78. In some embodiments, upper surface 76 is an anterior surface and lower surface 78 is a posterior surface. Washer 20 may have a sufficient thickness from upper surface 76 to lower surface 78 that optimizes strength and resistance to deformation, preferably about 1.5 to about 2.0 mm, more preferably about 1.6 mm (see, for example, FIG. 13).

Lower surface 78 includes frictional elements, such as serrations 82, to provide additional resistance between washer 20 and a surface of an implant (discussed below). Alternatively, frictional elements may include dimples, pits, depressions, projections, or other surface features, such as a roughened lower surface.

Figure 12:
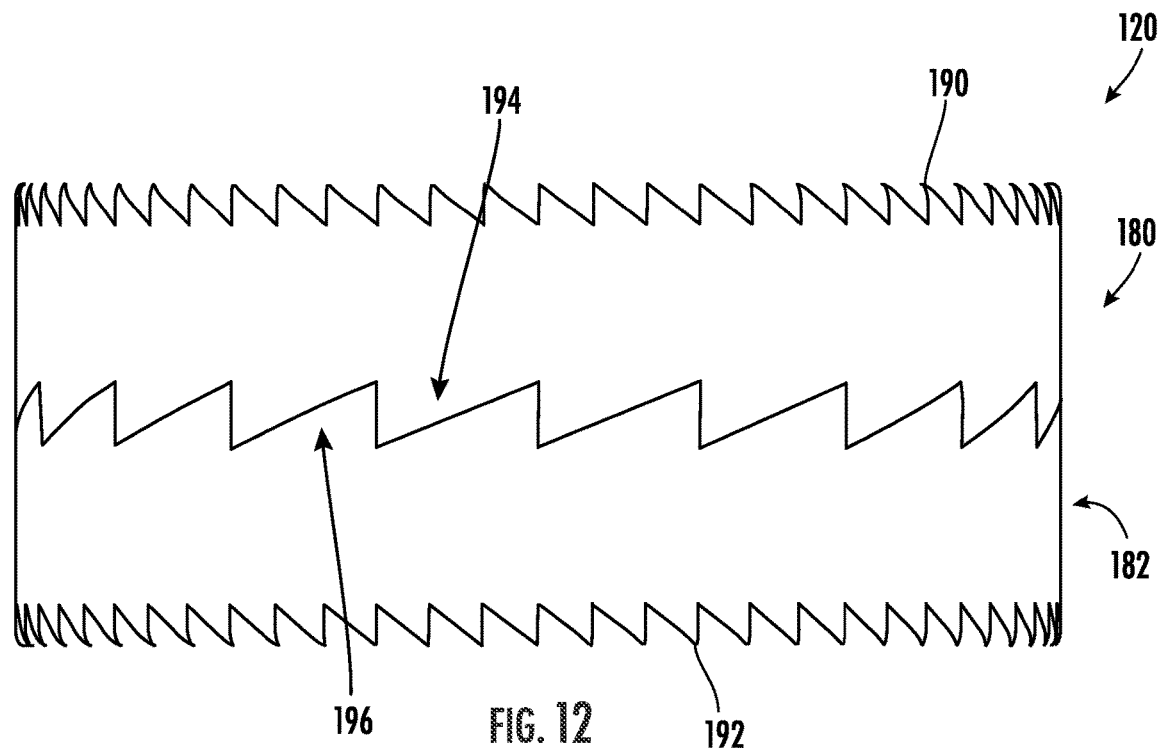
FIG. 12 is a side view of the washer of FIG. 11.

Upper surface 76 includes a plurality of cams 80 configured to interlock with cams 70 on head 32 of screw 30. Cams 80 have an inclination angle greater than the pitch of the threads of upper threaded portion 42. The inclination angle is defined as the angle that the cams 80 make with a horizontal plane extending through washer 20 that is perpendicular to the longitudinal axis of screw 30 (see for example, FIG. 12). The "thread pitch" also refers to the angle each thread makes with the horizontal plane extending through shaft 30 perpendicular to the longitudinal axis of screw 30.

Providing an inclination angle of the interlocked cams 70, 80 that is greater than the wedge or pitch angle of the threads of threaded portion 34 creates a wedge effect to prevent screw 30 from backing out or loosening from the implant, making it nearly impossible for the dynamic load of physiological forces to release the interlocked cams. Only a driver turning the bone screw counterclockwise with a specific torque parameter provides enough force to disengage the cams 70, 80 from each other. This results in a significant reduction or complete elimination of the screw 30 backing out from the implant.

The specific inclination angle of cams 80 will depend on the application and particularly on the pitch angle of threaded portion 34. In certain embodiments, the inclination angle of cams 80 is greater than 5 degrees, preferably greater than 10 degrees. In an exemplary embodiment, the cam inclination angle is about 11 degrees.

Of course, it should be recognized that fixation assembly 10 is not limited to the cams 70, 80 described above and shown in FIGS. 1-6. For example, cams 70, 80 may comprise other types of interlocking members, such as interference fitting members, or other frictional elements that lock or otherwise make it difficult to pull washer 20 apart from screw head 32. In addition, although cams 70, 80 extend around the entire circumference of washer 20 and head 32 the devices disclosed herein are not limited to this configuration. Cams 70, 80 may have a semicircular shape (i.e., only extending around a portion of the circumference of washer 20 and head 32), or cams 70, 80 may be formed at discrete locations around the circumference of washer 20 and head 32 (e.g. two cams formed on opposite sides, four cams spaced from each other and formed around washer 20, and head, etc.).

Internal threads 75 are configured to engage exterior threads 60 of the shank portion 40 of screw 30. Once washer 20 has been moved over shaft 30 and onto shank portion 40, rotation of washer 20 will causes threads 60, 75 to engage each other and displace washer 20 towards head 32 of screw 30. Threads 60, 75 are positioned such that washer 20 can be tightened against lower surface 62 of screw head 32, thereby allowing cams 70, 80 to interlock with each other. This reduces toggle of the screw that may result from compressive forces, providing additional rigidity to minimize breakage or fracture of the screw and washer assembly. Internal threads 70 may, for example, be threaded with a metric die, while external threads 60 may, for example, be formed with a metric tap.

Figure 4:
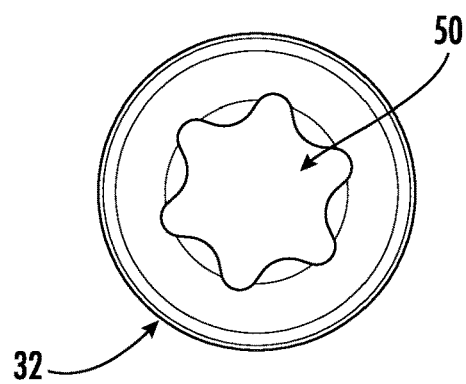
FIG. 4 is a top view of the screw of FIG. 2.

As shown in FIG. 4, screw head 32 includes a mating feature 50 for receiving an instrument designed to tighten screw 30 against a medical implant (discussed below). Mating feature is preferably configured to resist stripping from the use of force to allow the operator to provide more torque to tighten the screw. This feature may be particularly advantageous given that the presence of washer 20 requires significant tension to secure screw 20 to the implant. In certain embodiments, mating feature 50 comprises a shape that orients the flats more perpendicular to the axis of the applied force, such as a star-shaped or torx configuration.

Referring now to FIGS. 7-14, another embodiment of a fixation assembly 100 will now be described. Similar to the previous embodiment, assembly 100 comprises a washer 120 coupled to a fixation screw 130. Fixation screw 130 comprises a head 132 and a shaft 134 with a distal tip 136. In this embodiment, head 132 includes a substantially smooth lower surface 162 facing shaft 134, although it is recognized that head 132 may have a variety of different shapes and configurations, such as the substantially conical shape shown in FIG. 15. Alternatively, lower surface 162 may include serrations or other frictional elements that provides resistance to washer 120 (discussed below).

Shaft 134 includes a threaded portion 138 and a shank portion 140 between threaded portion 138 and head 132. In certain embodiments, threaded portion 138 may include an upper portion 142 near head 132 and a lower portion 144 near tip 136. Upper portion 142 preferably has a lower thread pitch (i.e. distance between threads) than lower portion 144 such that threaded portion 138 has a dual lead cortical cancellous pitch. The ratio of lower thread pitch to higher thread pitch may be similar to the embodiment described in FIGS. 1-6.

Figure 9:
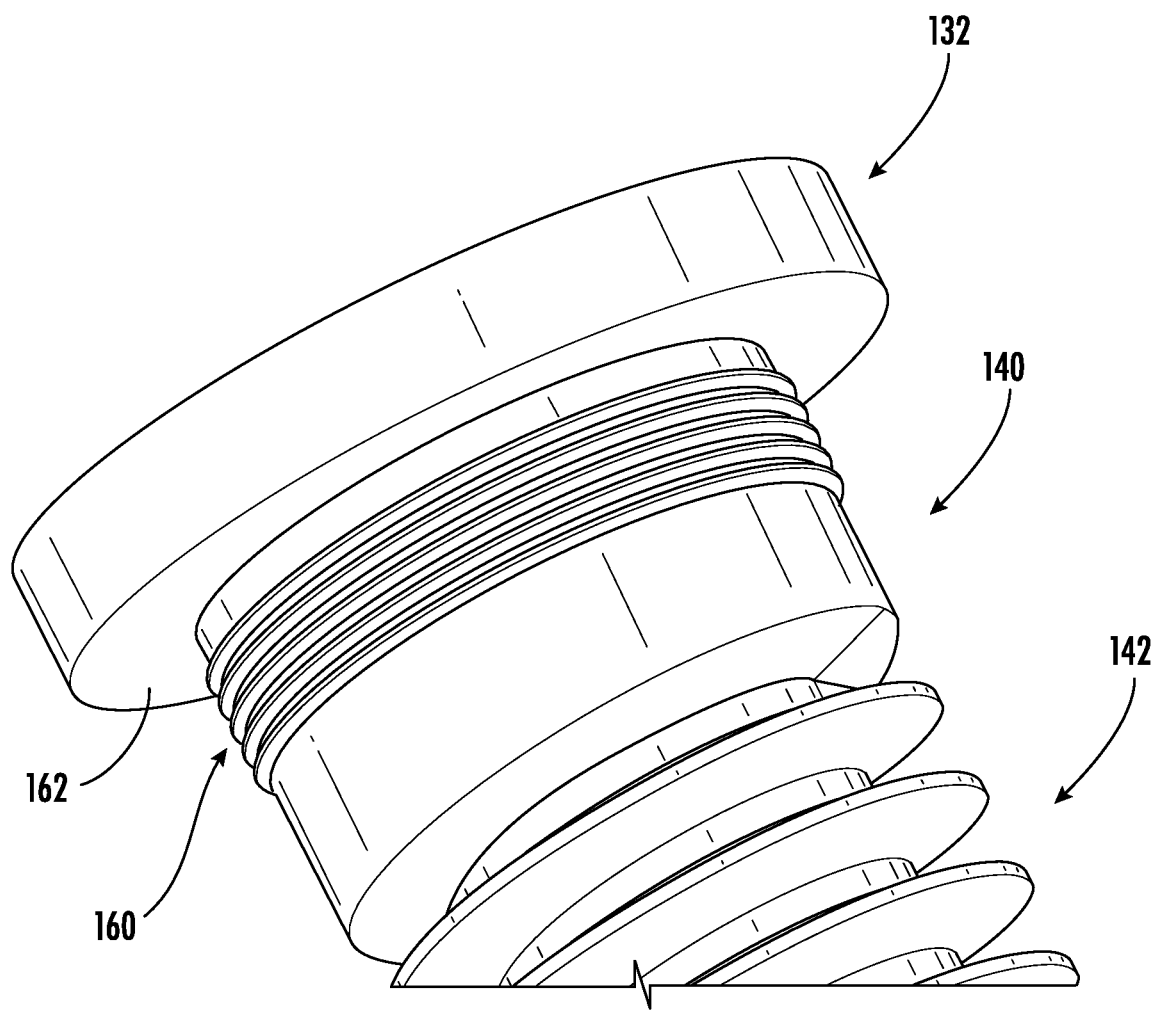
FIG. 9 is a close-up view of an upper portion of the screw of FIG. 8.
Figure 10:
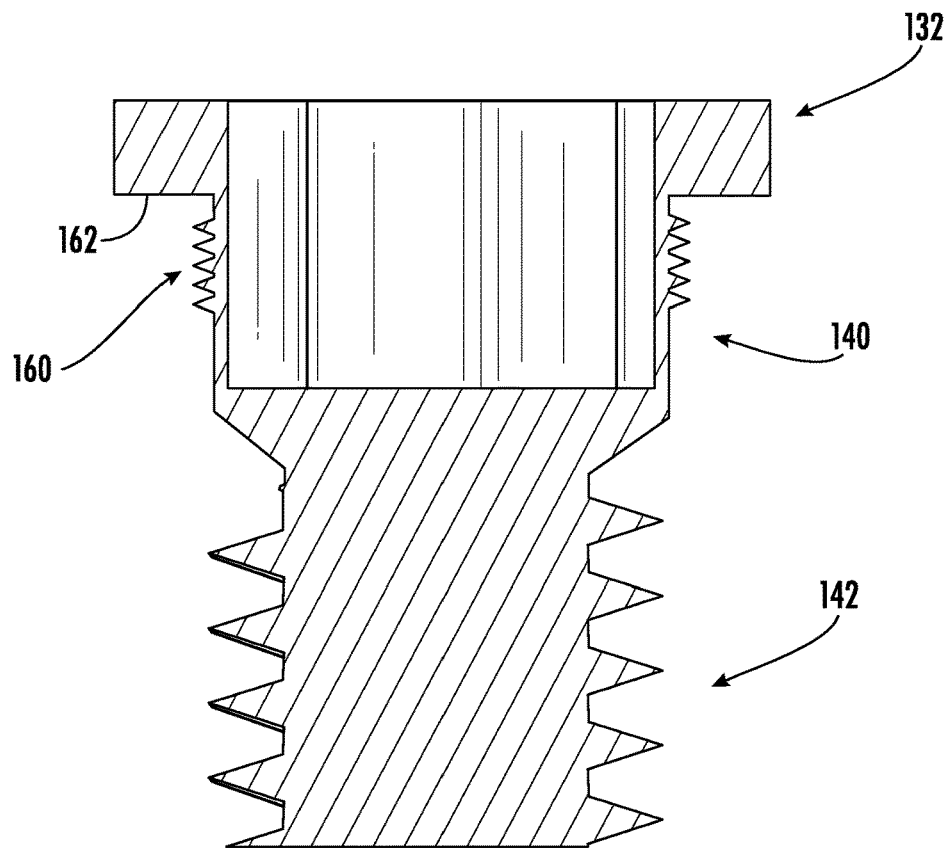
FIG. 10 is a cross-sectional view of the upper portion of the screw shown in FIG. 8.
Figure 11:
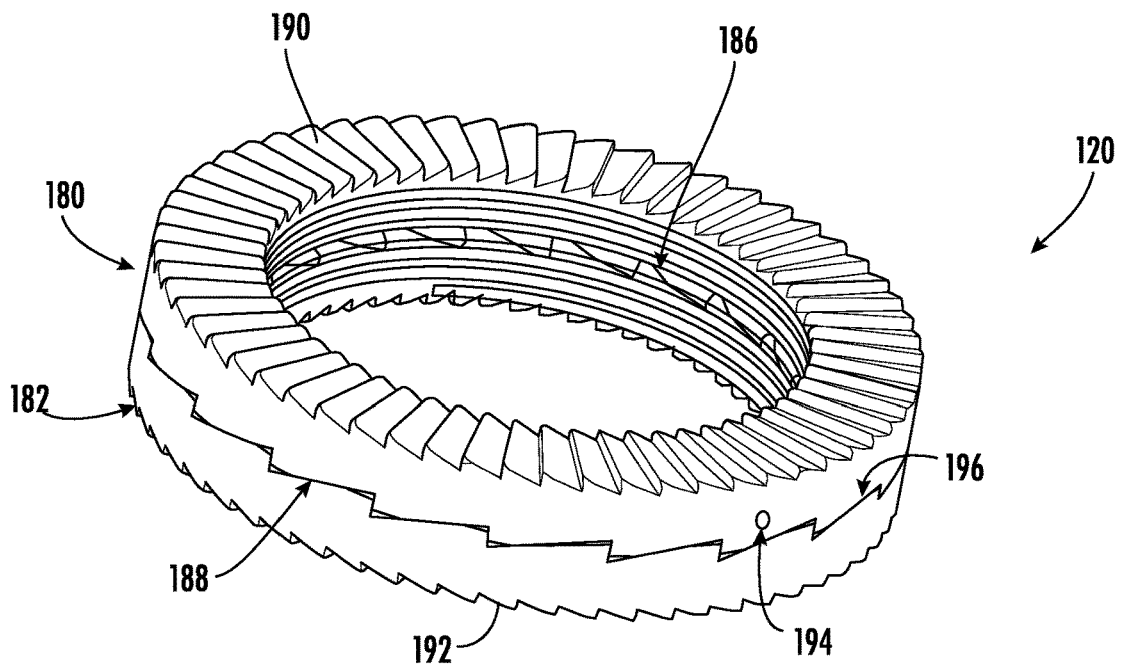
FIG. 11 is a perspective view of a washer of the fixation assembly of FIG. 7.

As shown in FIGS. 9 and 10, shank portion 140 extends from the upper part of threaded portion 142 and head 132 of fixation screw 130. Shank portion 140 includes external threads 160 that extends adjacent to, or near, a lower surface 162 of head 130. Threads 160 are configured to mate with internal threads 186 of washer 120 (shown in FIG. 11 and discussed below). Threads 160 preferably have a lower thread pitch than upper threaded portion 142. The ratio of thread pitch between threads 160 and the threads of upper portion 142 may be about 1:2 to about 1:10, preferably about 1:3 to about 1:5 (e.g., 1:4). In certain embodiments, the distance between threads 160 is about 0.1 mm to about 0.4 mm, preferably between about 0.15 mm to about 0.25 mm (e.g., 0.2 mm).

As shown in FIGS. 11-14, washer 120 includes a first, upper washer portion 180 and a second, lower washer portion 182. In certain applications, first washer portion 180 is an anterior portion and second washer portion 182 is a posterior portion. First and second washer portions 180, 182 each include an inner surface having internal threads 186 and an outer surface 188. Internal threads 184 are configured to engage exterior threads 160 of the shank portion 140 of screw 130. Once washer 120 has been moved over shaft 130 and onto shank portion 140, rotation of washer 120 will causes threads 160, 186 to engage each other and displace washer 120 towards head 132 of screw 130. Threads 160, 186 are positioned such that washer 120 can be tightened against lower surface 162 of screw head 132. Similar to the previous embodiment, this reduces toggle of the screw that may result from compressive forces, providing additional rigidity to minimize breakage or fracture of the screw and washer assembly.

Figure 14:
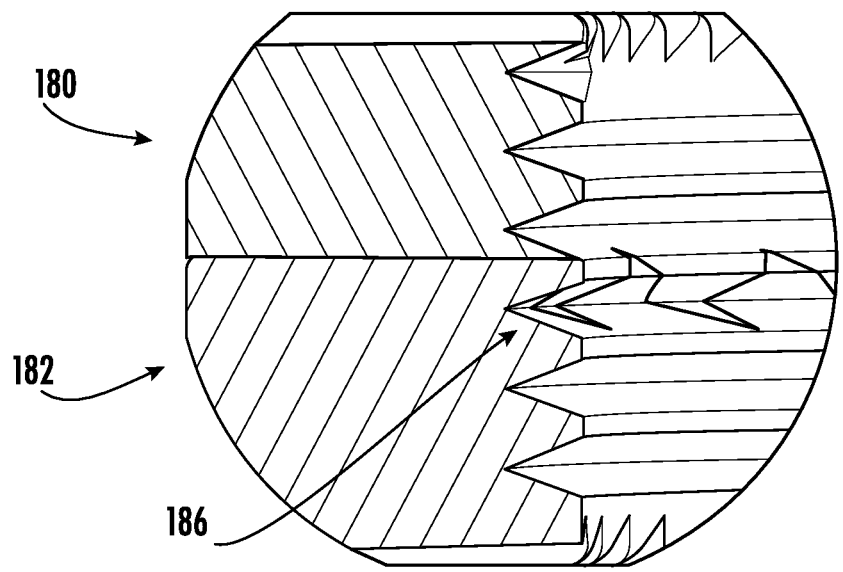
FIG. 14 is a close-up cross-sectional view of the washer of FIG. 11.

Internal threads 186 may have a thickness of about 0.1 mm to about 0.2 mm, preferably about 0.15 mm (see FIG. 14). Threads 186 may extend outward from washer 120 by about 0.1 to about 0.3 mm, preferably about 0.2 mm.

First washer portion 180 includes an upper surface with one or more serrations or other frictional elements 190 extending therefrom and second washer portion 182 includes a lower surface with one or more serrations or other frictional elements 192 extending therefrom. Serrations 190 function to provide additional resistance between washer 120 and lower surface 162 of head 132, while serrations 192 provide additional resistance between washer 120 and a surface of an implant (discussed below). Alternatively, lower surface 162 of head 132 may include serrations or frictional elements, or both head and washer portion 180 may include frictional elements that interact with each other. As in the previous embodiment, frictional elements 190, 192 may comprise dimples, pits, depressions, projections, or other surface features, such as a roughened lower surface.

Figure 13:
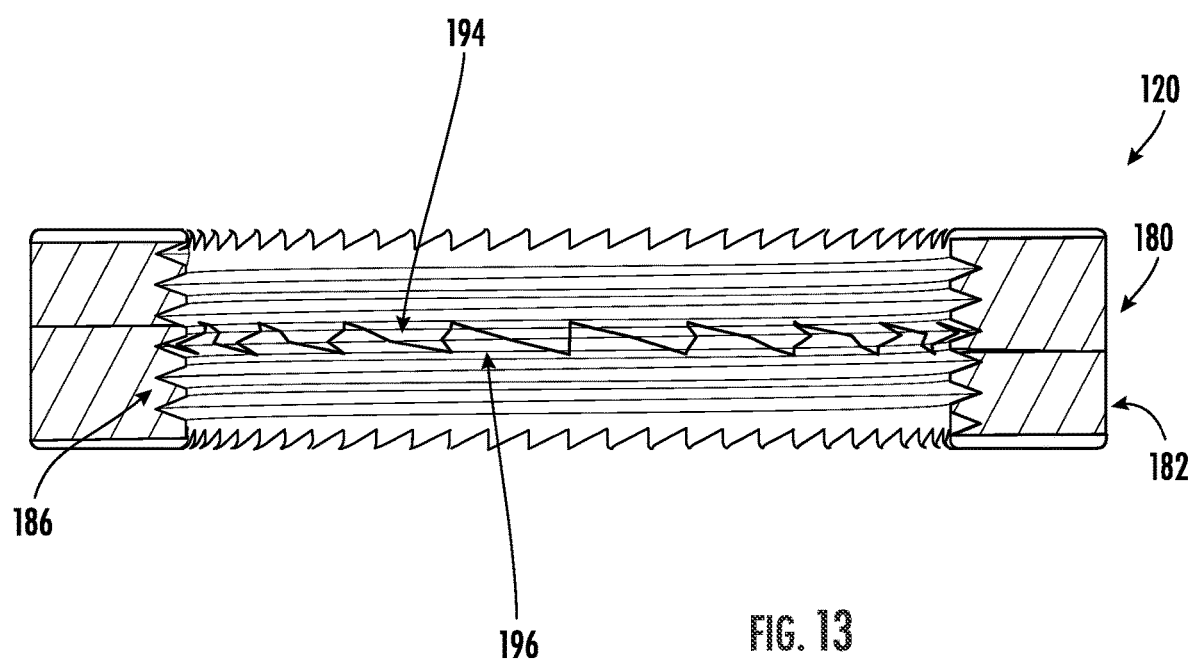
FIG. 13 is a cross-sectional view of the washer of FIG. 11.

Washer portions 180, 182 together may have a sufficient thickness that optimizes strength and resistance to deformation, preferably about 1.5 to about 2.0 mm, more preferably about 1.6 mm (see FIG. 13).

Upper washer portion 180 includes a plurality of cams 194 on its lower surface configured to interlock with cams 196 on an upper surface of lower washer portion 182. Cams 194, 196 have an inclination angle that is greater than the pitch of the threads of upper threaded portion 142 of shaft 134. Similar to the previous embodiments, this creates a wedge effect to prevent screw 130 from backing out or loosening from the implant, making it nearly impossible for the dynamic load of physiological forces to release the interlocked cams In certain embodiments, the inclination angle of cams 194, 196 is greater than 5 degrees, preferably greater than 10 degrees. In an exemplary embodiment, the cam inclination angle is about 11 degrees.

As in the previous embodiment, cams 194, 196 may comprise other types of interlocking members, such as such as interference fitting members, or other frictional elements that lock or otherwise make it difficult to pull washer 120 apart from screw head 132. Cams 194, 196 may also have a semicircular shape, or cams 194, 196 may be formed at discrete locations around the circumference of washer 120 and head 132.

Figure 15:
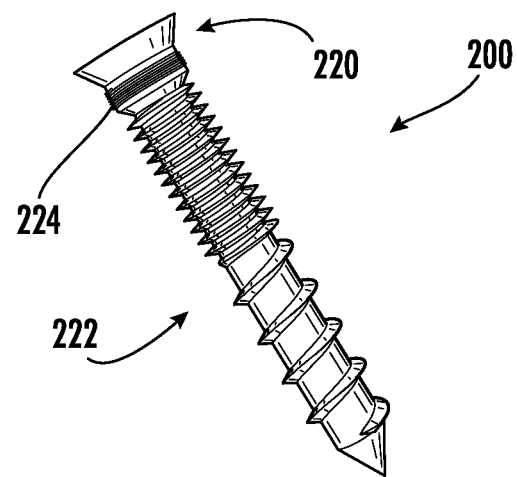
FIG. 15 is a side view of another embodiment of a screw for a fixation assembly.

FIG. 15 illustrates another embodiment of a screw 200 that includes a head 220 and a shaft 222. Head 220 generally tapers in the direction towards shaft 222 to form a substantially conical shape. Shaft 222 includes external threads 224 for mating with the internal threads of a washer (not shown) similar to the embodiments described above. In this embodiment, the washer preferably has a design similar to washer 120 as the conical shape of screw head 220 precludes the use of cams on head 220. The washer, however, may have a tapered upper surface with serrations thereon to provide more engagement with head 220.

Figure 16A:
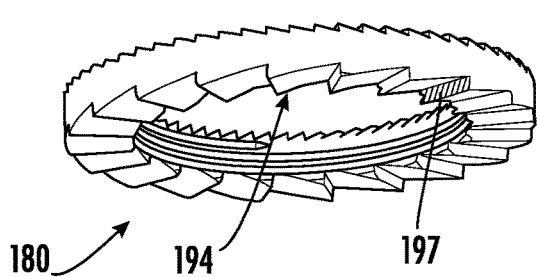
FIGS. 16A-16C illustrate a method of assembling a fixation assembly to a medical implant.
Figure 16B:
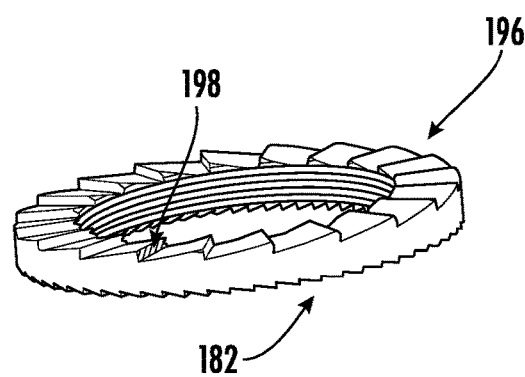
Figure 16C:
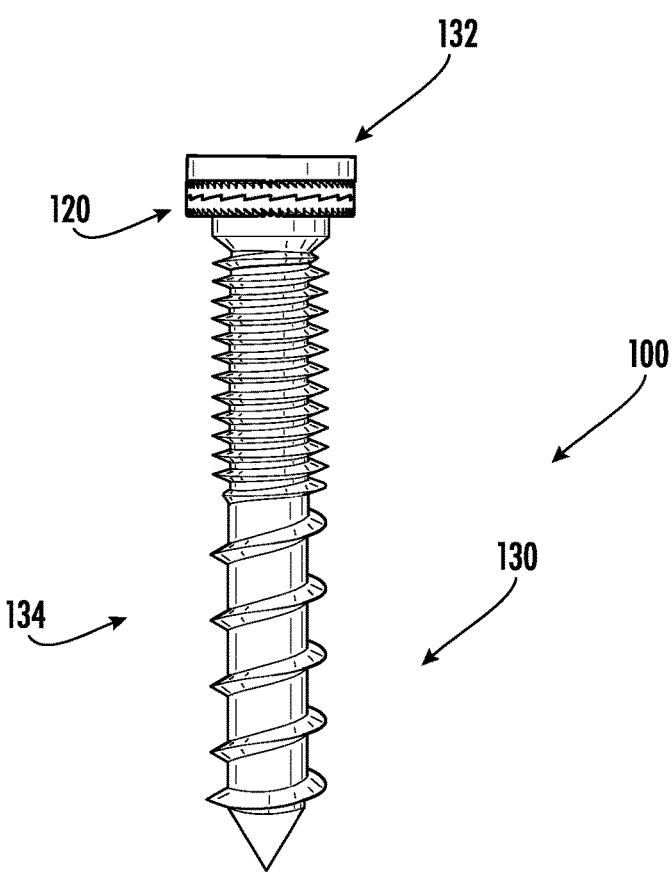
Figure 17:
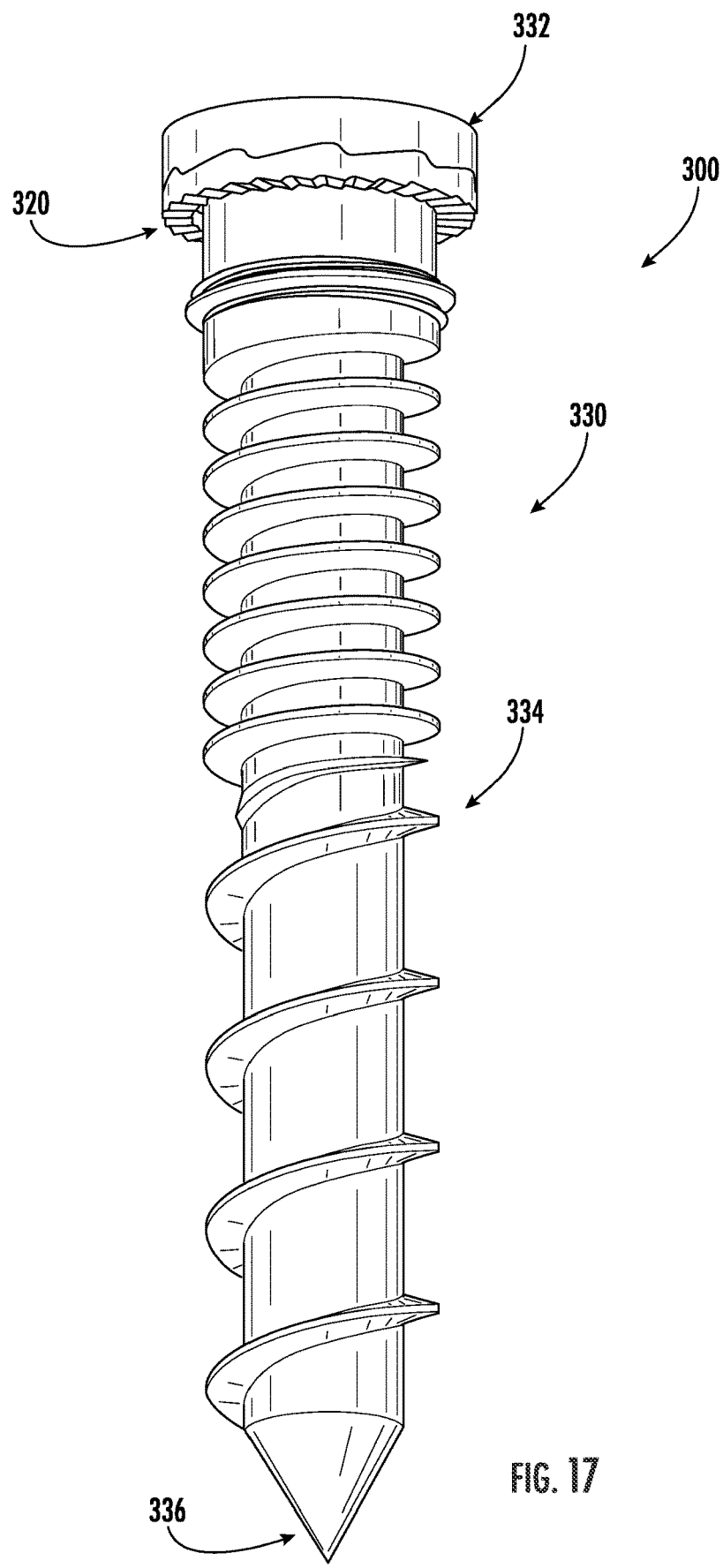
FIG. 17 is side view of another embodiment of a fixation assembly.

FIGS. 16A-16C conceptually depict a method of assembling the fixation assembly 100 described in FIGS. 7-14. For spinal implants, such as an interbody fusion device, the surgeon will complete the discectomy and trialing and then begin to assembly fixation assembly 100. As shown in FIGS. 16A and 16B, first and second washer portions 180, 182 each include a visual indicator 197, 198, which may be located on one of the cams 194, 196. Visual indicators 197, 198 may comprise any suitable indicator for the physician to easily locate them, such as colors, markings, letters, surface features and the like. In one embodiment, visual indicators 197, 198 are colored (e.g., red).

Once the operator has located visual indicators 197, 198, they are aligned with each other to ensure that the appropriate patterned threads match to lock washer 120 to bone screw 130. Washer portions 180, 182 are locked together and then advanced up shaft 132 of screw 130 until they are positioned opposite external threads 160 of shank portion 140 (see FIG. 7). Internal threads 186 are aligned with external threads 160 and washer portions 180, 182 are rotated relative to shaft 132, preferably in a direction that secures cams 194, 196 to each other (i.e., in the direction that locks the cams). In one embodiment, this direction is clockwise, although those skilled in the art will recognize that the configuration of cams 194 196 can be reversed to enable a counterclockwise rotation.

Washer portions 180, 182 are preferably rotated until serrations 190 on upper washer portion 180 come in contact with, and engage, lower surface 162 of screw head 132 (see FIG. 16C). The operator should ensure that washer portions 180 182 are secured to screw 130 and serrations 190 have solid contact with head 132.

The operator may then attach mating feature 150 of screw head 132 to a suitable instrument driver (not shown) and place fixation assembly 100 into an appropriate hole of an implant. The screw 130 is driven into the bone of the patient (e.g., a vertebral body) until serrations 192 on lower washer portion 182 come in contact with, and engage, a surface of the implant. The operator should use sufficient torque when placing screw 130 to ensure tension is placed on washer portions 180, 182, which activates the wedge-lock component and prevents screw 130 from backing out of the hole.

A method of assembling the fixation assembly 10 described above and illustrated in FIGS. 1-6 is similar except that cams 80 of washer 20 and cams 70 on head 32 of screw 30 are interlocked with each other after washer 20 has been rotated relative to shaft 32, until cams 80 come in contact with, and engage, cams 70 of screw head 32.

Referring now to FIGS. 17-24, another embodiment of a fixation assembly 300 will now be described. Fixation assembly 300 comprises a washer 320 coupled to a fixation screw 330. Fixation screw 330 comprises a head 332 and a shaft 334 with a distal tip 336. Shaft 334 includes a threaded portion 338 and a shank portion 340 between threaded portion 338 and head 332. Fixation screw 330 may be cannulated or non-cannulated. In some embodiments, fixation screw 330 may be cannulated and comprise a central hole or lumen extending through its longitudinal axis. Screw 330 may be self-tapping and self-drilling and may be of a bone-screw type, such as those well known to skilled artisans. In some embodiments, screw 330 may, for example, include notches or cutouts in the distal tip and/or cement holes in the shaft to facilitate self-tapping.

Fixation assembly 300 and its components may be formed of any suitable medical grade material, such as biocompatible metals like stainless steel, titanium, titanium alloys, etc. or a medical grade plastic such as polyetheretherketone (PEEK) or another radiolucent material, ultra high molecular weight polyethylene (UHMWPE), etc. If so desired, the fixation assembly 300 may also be formed of a bioresorbable material. The bioresorbable material may preferably be osteoconductive or osteoinductive (or both).

Figure 18:
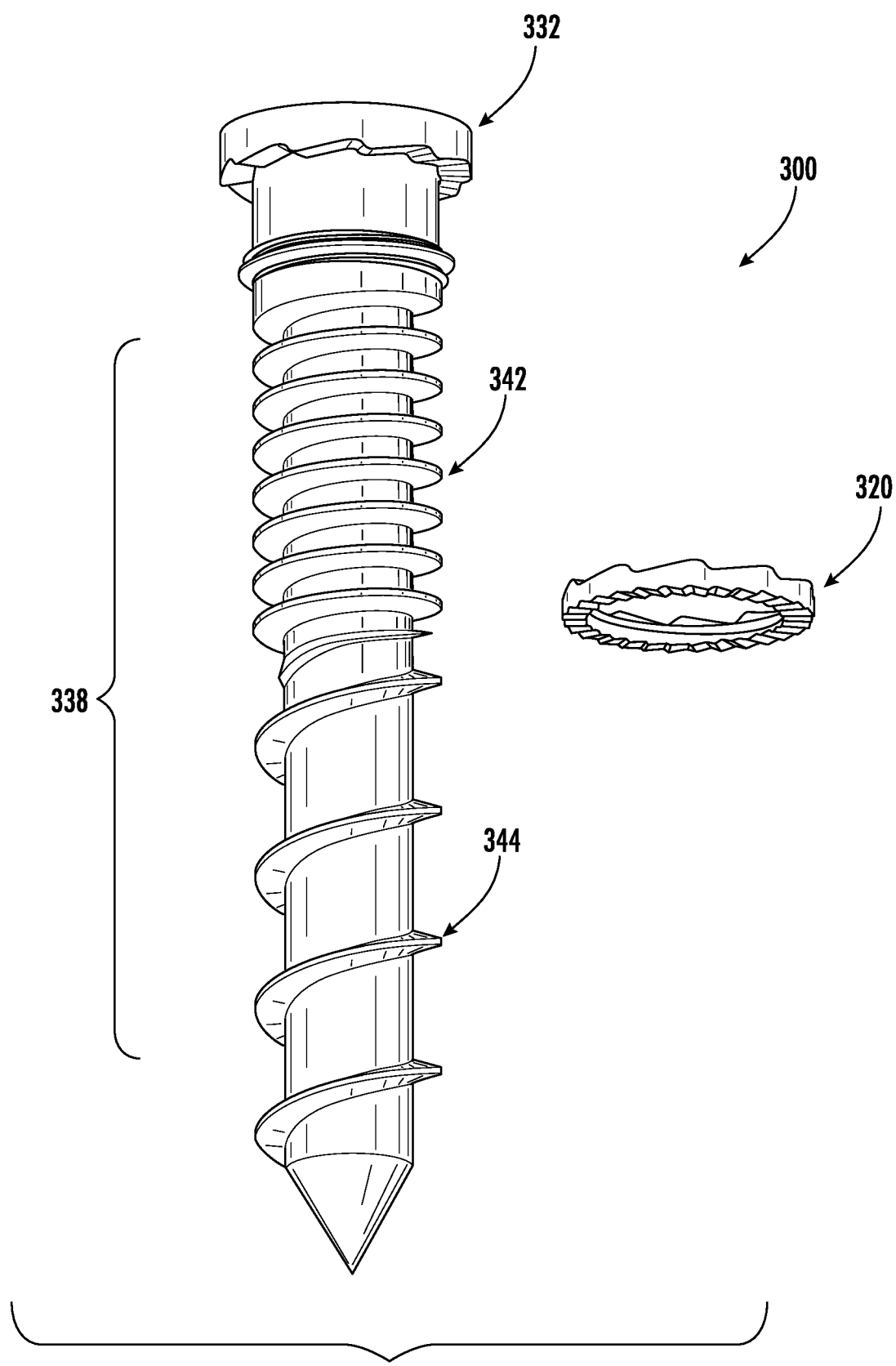
FIG. 18 is an exploded view of the fixation assembly of FIG. 17.

Referring to FIG. 18, threaded portion 338 may include an upper portion 342 near head 332 and a lower portion 344 near tip 336. Upper threaded portion 342 preferably comprises about 20% to about 75% of the total length of threaded portion 338, preferably about 25% to about 50%. The threads in upper and lower portions 342, 344 preferably extend outward about the same distance from shaft 334, although their outer dimensions may differ depending on the application. In one embodiment, the threads extend outward from shaft 334 by about 0.5 mm to 1.5 mm, or about 0.75 mm to about 0.85 mm.

Upper portion 342 preferably has a lower thread pitch (i.e., the distance between threads) than lower portion 344. The ratio of lower thread pitch to higher thread pitch may be about 1:2 to about 1:5, preferably about 1:3 to 1:4 (e.g., about 1:3.5). In certain embodiments, the distance between threads in upper portion 342 is about 0.5 mm to about 1.0 mm, preferably about 0.8 mm and the distance between threads in lower portion 344 is about 2.0 mm to about 4.0 mm, preferably about 2.5 mm to about 3.0 mm (e.g., 2.75 mm). The higher thread pitch towards tip 336 of the screw allows for a greater purchase into cancellous bone, while the lower thread pitch towards head 332 increases the holding power of the screw. In addition, the lower thread pitch of upper portion 342 provides for a smaller wedge angle for the threads (i.e., the angle that the thread make with a horizontal plane passing perpendicular to the longitudinal axis of the screw). This provides additional advantages in tandem with the larger cam angle created by the interlocking cams 370, 380 of washer 320 and screw head 332 (discussed below).

Of course, the devices disclosed herein are not limited to the thread pitch configuration described above. For example threaded portion 338 may also have a single, substantially uniform thread pitch throughout its length. Alternatively, threaded portion 338 may have more than two different thread pitches. In some embodiments, the thread pitches of upper portion 342 and lower portion 344 may be reversed such that upper portion 342 has a higher thread pitch than lower portion 344.

Figure 20:
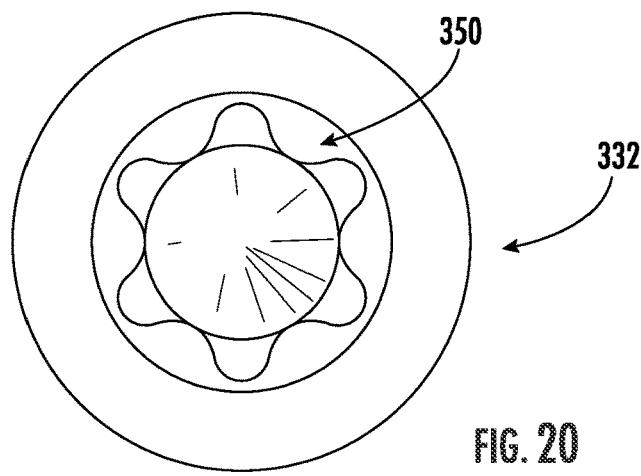
FIG. 20 is a top view of the screw head of FIG. 19.
Figure 21:
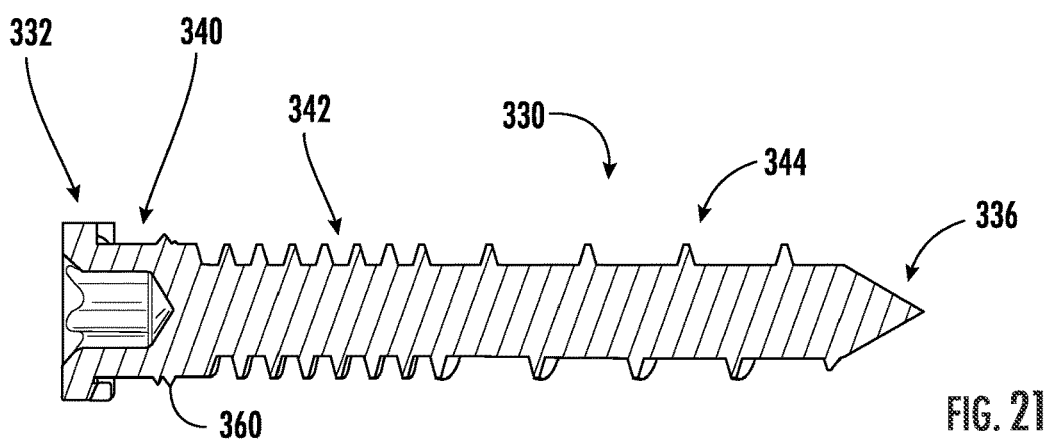
FIG. 21 is a cross-sectional view of a screw of the fixation assembly of FIG. 17.

As shown in FIG. 20, screw head 32 includes a mating feature 350 for receiving an instrument designed to tighten screw 330 against a medical implant (discussed below). Mating feature is preferably configured to resist stripping from the use of force to allow the operator to provide more torque to tighten the screw. This feature may be particularly advantageous given that the presence of washer 320 requires significant tension to secure screw 320 to the implant. In certain embodiments, mating feature 350 comprises a shape that orients the flats more perpendicular to the axis of the applied force, such as a star-shaped or torx configuration.

Figure 19:
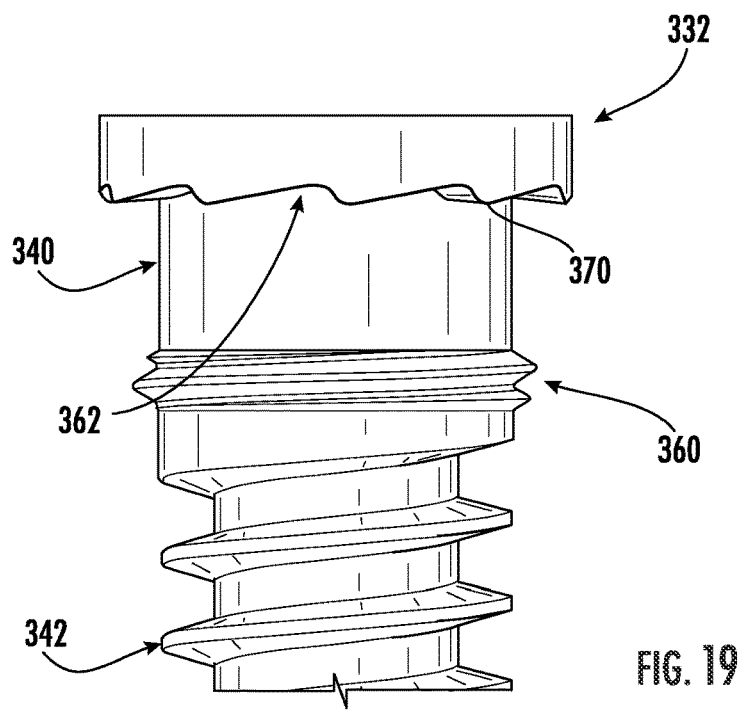
FIG. 19 is a close-up view of a screw head of the fixation assembly of FIG. 17.

Referring now to FIGS. 18 and 19, shank portion 340 extends from the upper part of threaded portion 342 and head 332 of fixation screw 320. Shank portion 340 includes a locking mechanism for ensuring that washer 320 does not translate distally after it has been attached to screw head 332 (discussed below). In one embodiment, the locking mechanism comprises one or more projections 360 that extend outward from the shaft between head 332 and upper threaded portion 342. Projections 360 may comprise extrusions, bumps, threads, or any other type of projection that extends from shank 340. In some embodiments, projections 360 are frictional elements, such as surface roughening and the like.

In an exemplary embodiment, projections 360 comprise extrusions that have been formed into a spiral formation around shank 340. The extrusions preferably extend outward from shank 340 a sufficient distance to inhibit or prevent washer 320 from sliding back down the shaft 330 of screw after it has been advanced past the extrusions. In one such embodiment, projections 360 extend outward from shank 340 a distance of about 0.25 mm to about 0.5 mm, preferably about 0.375 mm. Projections 360 and shank 340 together form a combined cross-sectional area relative to the longitudinal axis of the shaft 338. As discussed in further detail below, this combined cross-sectional area is sized to allow proximal translation of washer 320 over projections 360 to screw head 332, while inhibiting or preventing distal translation of the washer 320 back over projections 360.

Referring now to FIGS. 22A-22C, 23A-23D and 24A-24B, washer 320 may have a substantially annular shape with a central opening having an inner diameter or cross-sectional area sized to fit over shaft 334 and fit against head 332 to minimize loosening of screw 330. In certain embodiments, washer 320 may have an at least an upper surface 376 with an enlarged outer diameter, thereby increasing the surface area of contact to distribute the load from screw 330 over a larger area. In an exemplary embodiment, the upper surface 376 of washer 320 has an outer diameter substantially equal to the outer diameter of head 332. In other embodiments, washer 320 have may have a larger outer diameter than head 332.

Washer 320 includes an inner surface 375, an outer surface 374 and upper and lower surfaces 376, 378. Upper surface 376 generally faces towards head 332 of screw 330 and lower surface 378 generally faces towards distal tip 336. In some embodiments, upper surface 376 is an anterior surface and lower surface 378 is a posterior surface. Washer 320 may have a sufficient thickness from upper surface 376 to lower surface 378 that optimizes strength and resistance to deformation, preferably about 1.5 to about 2.0 mm, more preferably about 1.6 mm.

Lower surface 378 includes frictional elements, such as serrations 382, to provide additional resistance between washer 320 and a surface of an implant (discussed below). Alternatively, frictional elements may include dimples, pits, depressions, projections, or other surface features, such as a roughened lower surface.

Figure 22A:
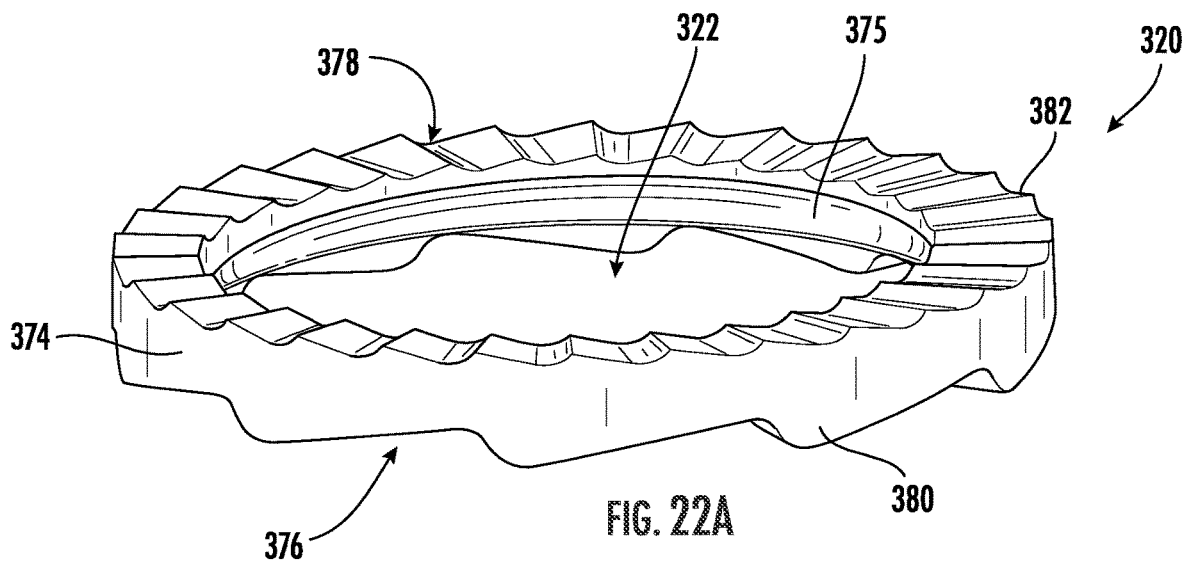
FIGS. 22A-22C are perspective views of a washer of the fixation assembly of FIG. 17.
Figure 22B:
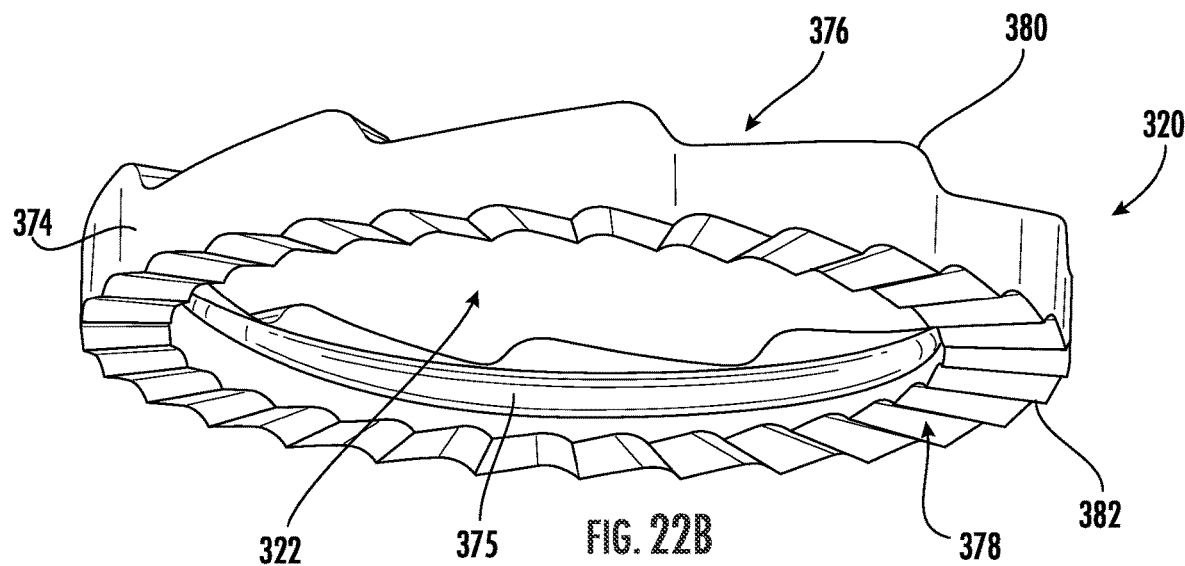
Figure 22C:
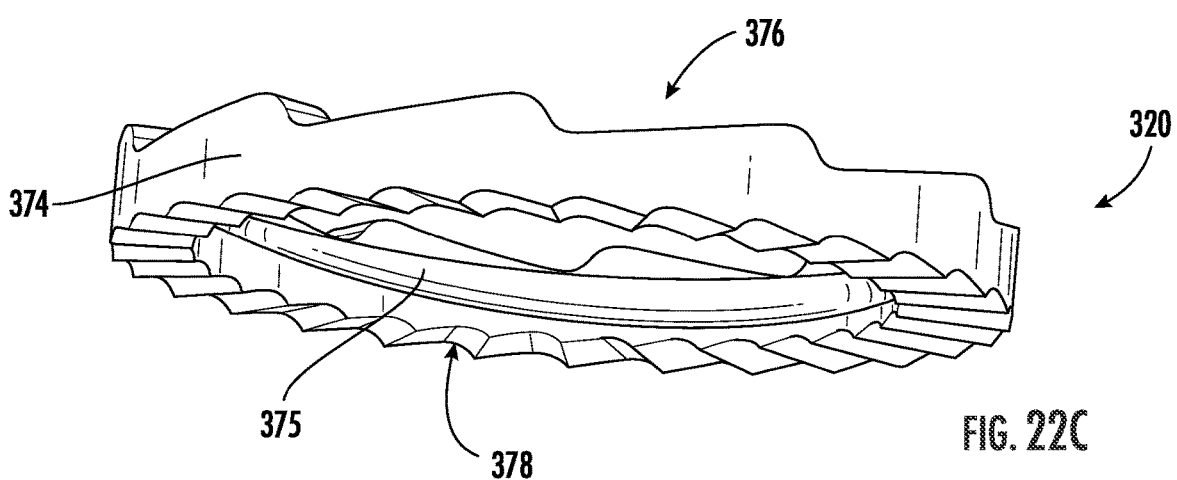

As shown in FIGS. 19, head 332 may further include a plurality of cams 370 on a lower surface 362 of head 332 that are configured to interlock with corresponding cams 380 on washer 320 (see FIG. 22A). Cams 380 may have an inclination angle greater than the pitch of the threads of upper threaded portion 342. The inclination angle is defined as the angle that the cams 380 make with a horizontal plane extending through washer 320 that is perpendicular to the longitudinal axis of screw 330. The "thread pitch' also refers to the angle each thread makes with the horizontal plane extending through shaft 330 perpendicular to the longitudinal axis of screw 330.

Providing an inclination angle of the interlocked cams 370, 380 that is greater than the wedge or pitch angle of the threads of threaded portion 334 creates a wedge effect to prevent screw 330 from backing out or loosening from the implant, making it nearly impossible for the dynamic load of physiological forces to release the interlocked cams. Only a driver turning the bone screw counterclockwise with a specific torque parameter provides enough force to disengage the cams 370, 380 from each other. This results in a significant reduction or complete elimination of the screw 330 backing out from the implant.

The specific inclination angle of cams 380 will depend on the application and particularly on the pitch angle of threaded portion 334. In certain embodiments, the inclination angle of cams 80 is greater than 5 degrees, preferably greater than 10 degrees. In an exemplary embodiment, the cam inclination angle is about 11 degrees.

Of course, it should be recognized that fixation assembly 300 is not limited to the cams 370, 380 described above and shown in FIGS. 17-24. For example, cams 370, 380 may comprise other types of interlocking members, such as interference fitting members, or other frictional elements that lock or otherwise make it difficult to pull washer 320 apart from screw head 332. In addition, although cams 370, 380 extend around the entire circumference of washer 320 and head 332 the devices disclosed herein are not limited to this configuration. Cams 370, 380 may have a semicircular shape (i.e., only extending around a portion of the circumference of washer 320 and head 332), or cams 370, 380 may be formed at discrete locations around the circumference of washer 320 and head 332 (e.g. two cams formed on opposite sides, four cams spaced from each other and formed around washer 320, and head, etc.).

Figure 24A:
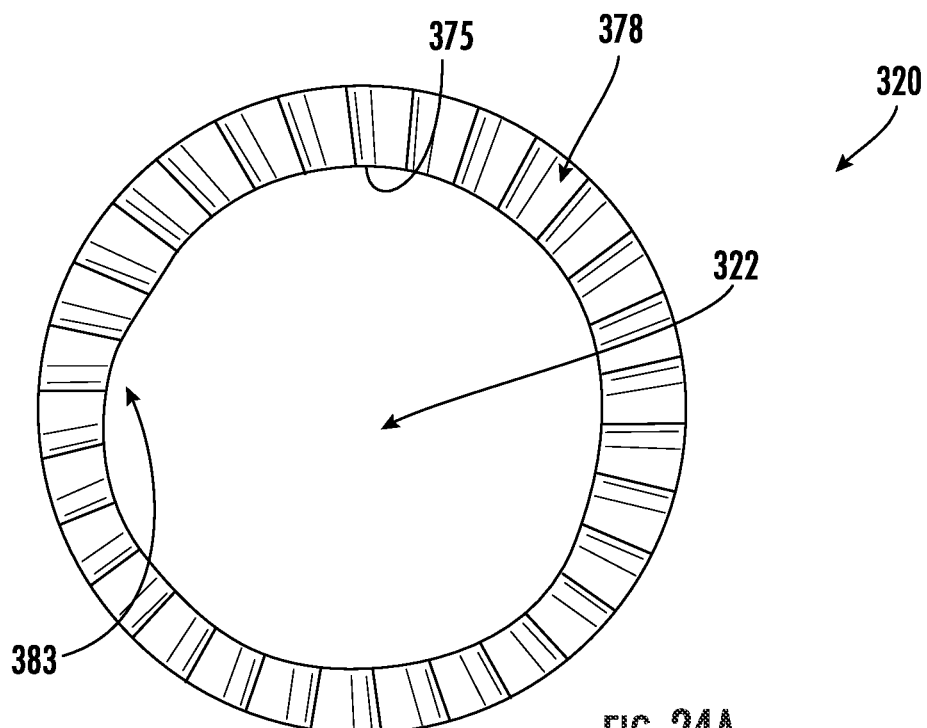
FIG. 24A is a bottom view of the washer.
Figure 24B:
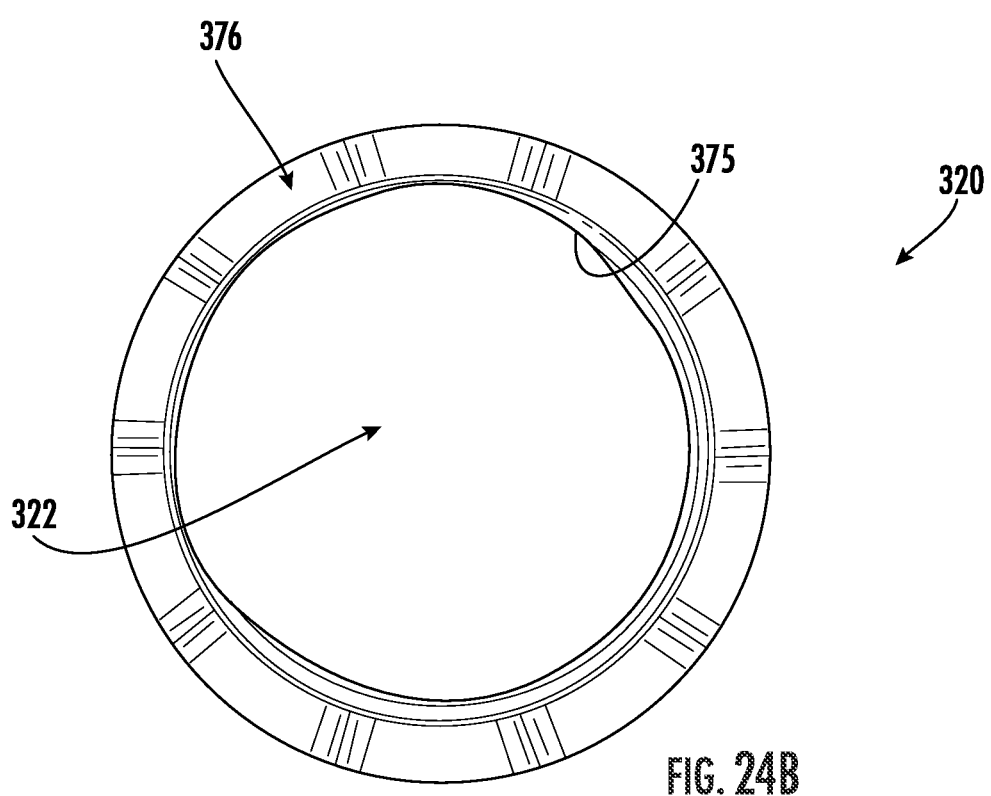
FIG. 24B is a top view of the washer.
Figure 25A:
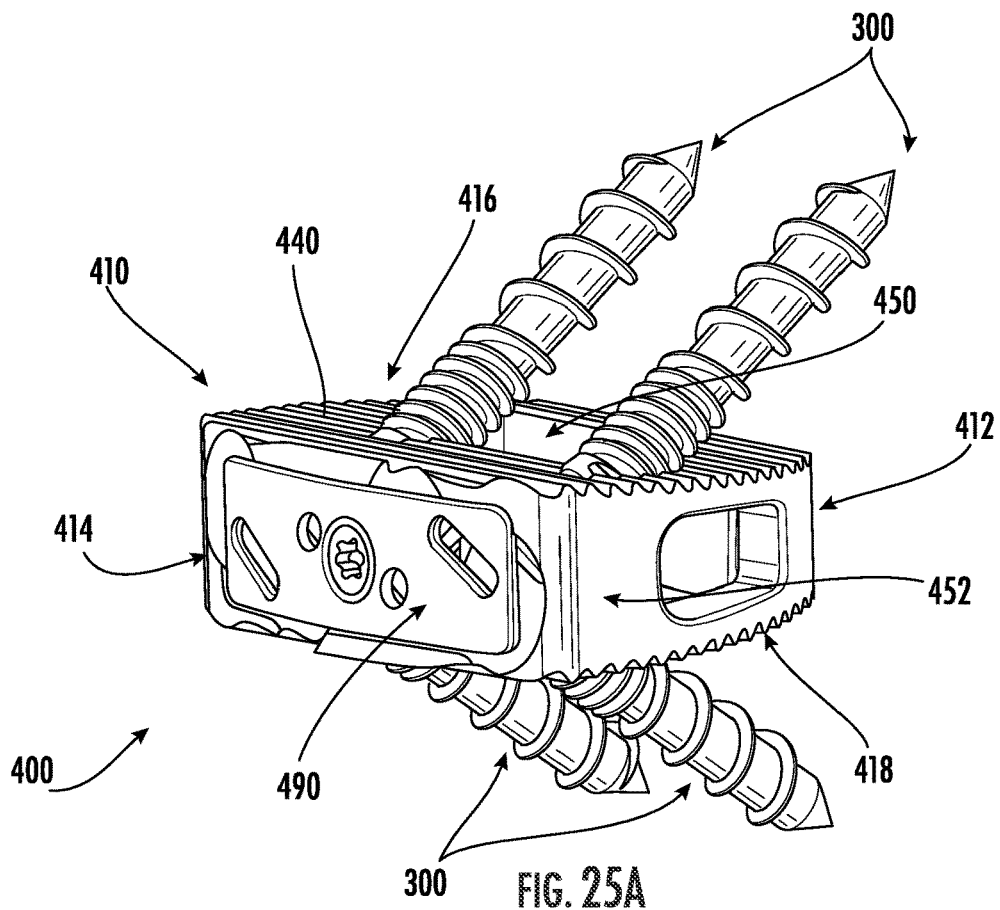
FIGS. 25A-25D are perspective views of a spinal implant with the fixation assembly of FIG. 17.
Figure 25B:
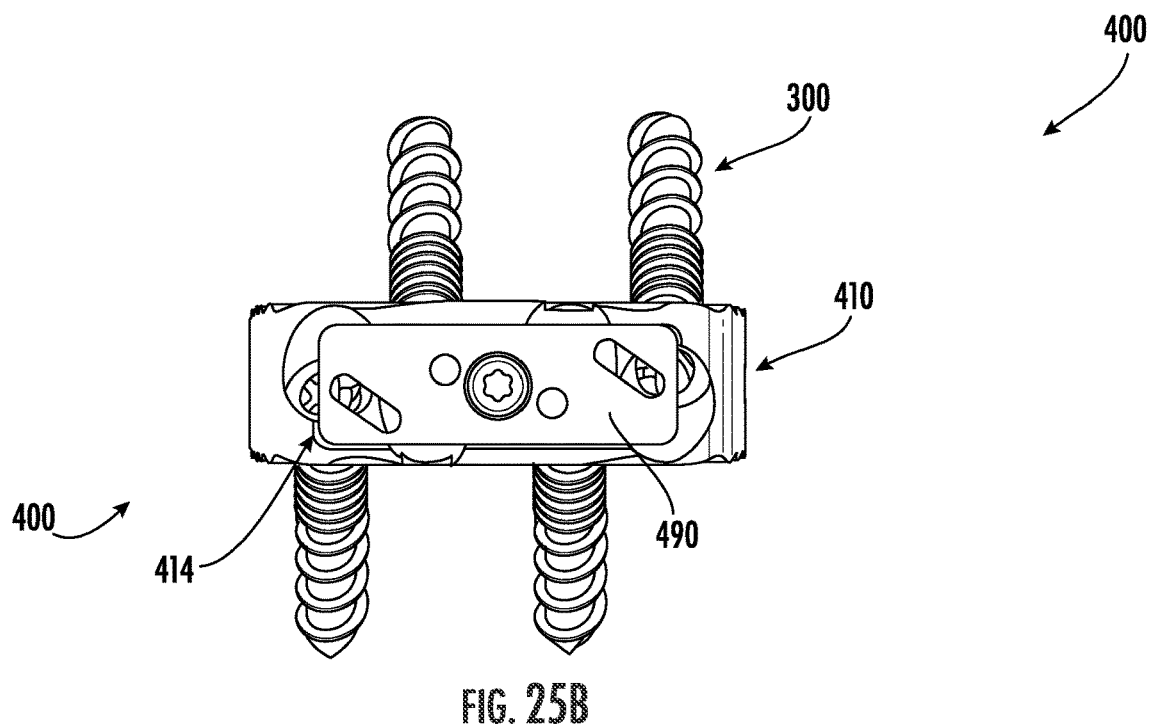
Figure 25C:
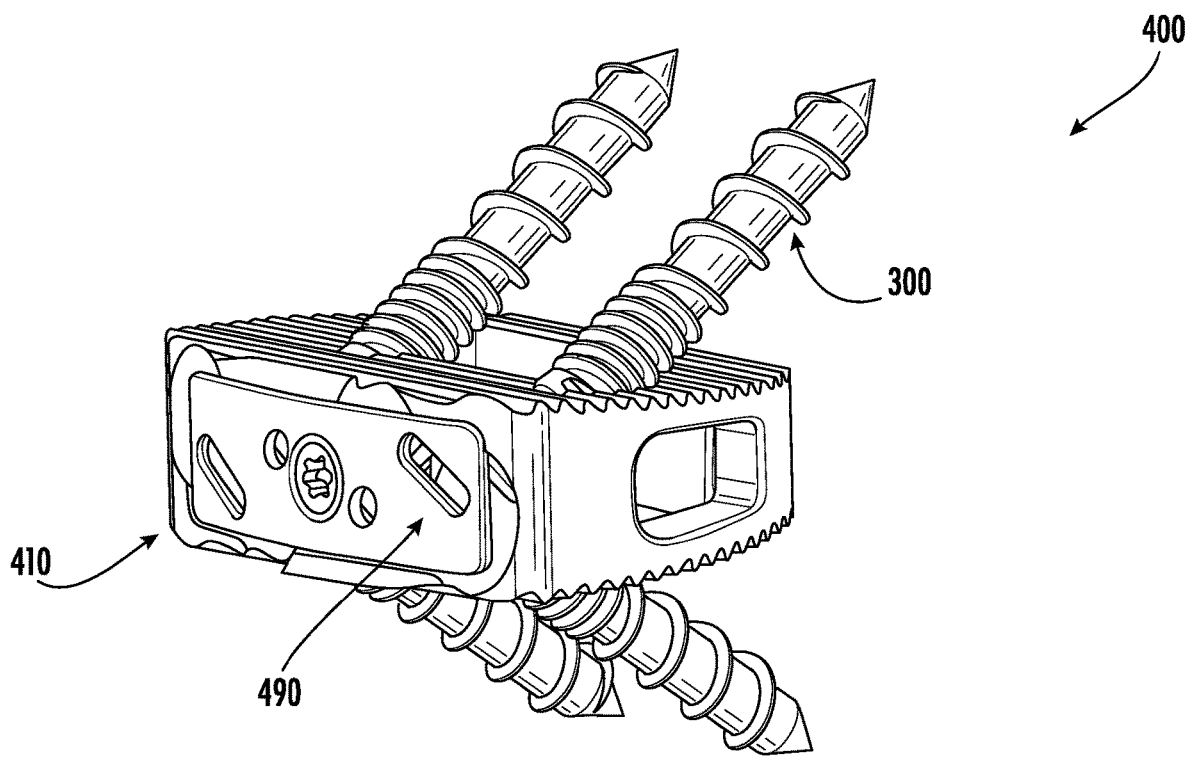
Figure 25D:
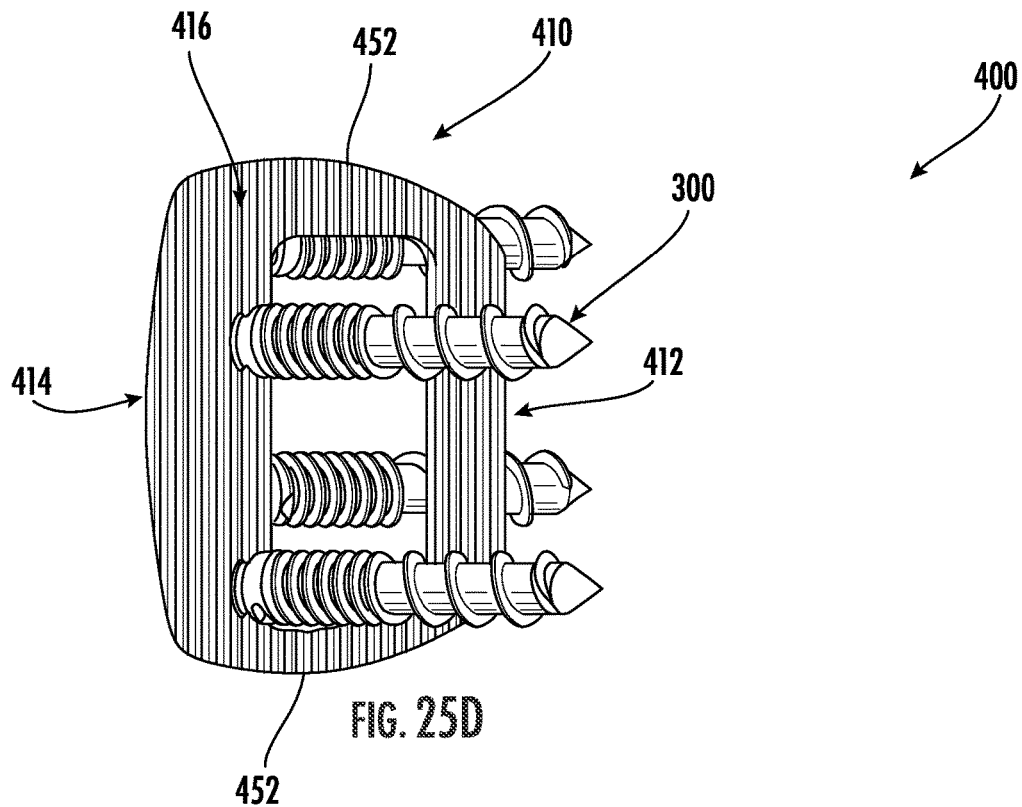

As shown in FIGS. 24A and 24B, central opening 322 of washer 320 has a smaller cross-sectional area at the upper surface 376 (FIG. 24B) than the lower surface 378 (FIG. 24A). More specifically, inner surface 375 around the perimeter of opening 322 has a substantially circular shape at upper surface 376 that generally corresponds to the size and dimension of head 332 of screw 330 so that cams 370, 380 may engage with each other to secure washer 320 to head 332. By contrast, one portion of inner surface 375 includes a bulge or cutout 383 at lower surface 378 that increases the internal distance from a first portion of the inner surface 375 to a second portion opposite the first portion. This cutout 383 increases the overall cross-sectional area of the opening 322 within washer 320 at the lower surface 378 (relative to the overall cross-sectional area of the opening 322 within washer at the upper surface 376).

The cross-sectional area of opening 322 at upper surface 376 is also smaller than the combined cross-sectional area of projections 360 and shank 340. This prevents washer 320 from sliding distally down shaft 338 after it has been attached to screw head 332. At the same time, the cross-sectional area of opening 322 at lower surface 378 is larger than combined cross-sectional area of projections 360 and shank 340. This allows the operator to advance washer 320 proximally over projections 360 to secure washer 320 to screw head 332.

In an exemplary embodiment, at least one portion of the inner surface 375 at lower surface 378 has a larger diameter (or is further from the longitudinal axis of the shaft) than the outer diameter of projections 360 on shank 340 of screw 330. This allows washer 320 to be passed proximally over projections 360 towards the screw head 332. At the same time, the diameter of inner surface 375 at upper surface 376 is smaller than the diameter of projections 360 on shank 340 of screw 330. This prevents the washer 320 from passing distally back over projections 360 once it has been advanced over shank 340 to screw head 332.

In use, the operator advances washer 320 over distal tip 336 and shaft 334 of screw 330. When the washer 320 engages projections 340, the operator may toggle, shift, rotate, adjust or otherwise manipulate washer 320 so that cutout 383 aligns with projections 340 and allows the operator to advance washer 320 distally past the projections 340 to head 332. Once washer 320 has been moved distally of projections 340, it generally will not slip past projections proximally unless it is manipulated by the operator in a similar manner.

Figure 23A:
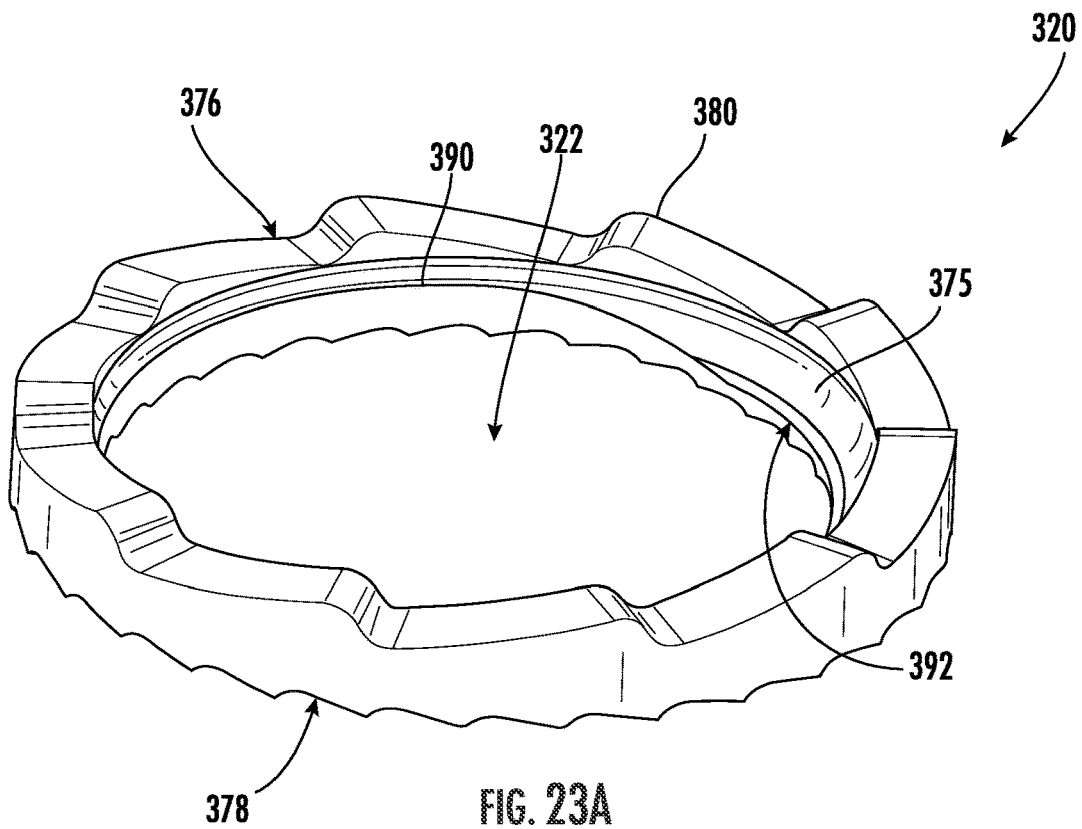
FIGS. 23A-23D are further perspective views of a washer of the fixation assembly of FIG. 17.
Figure 23B:
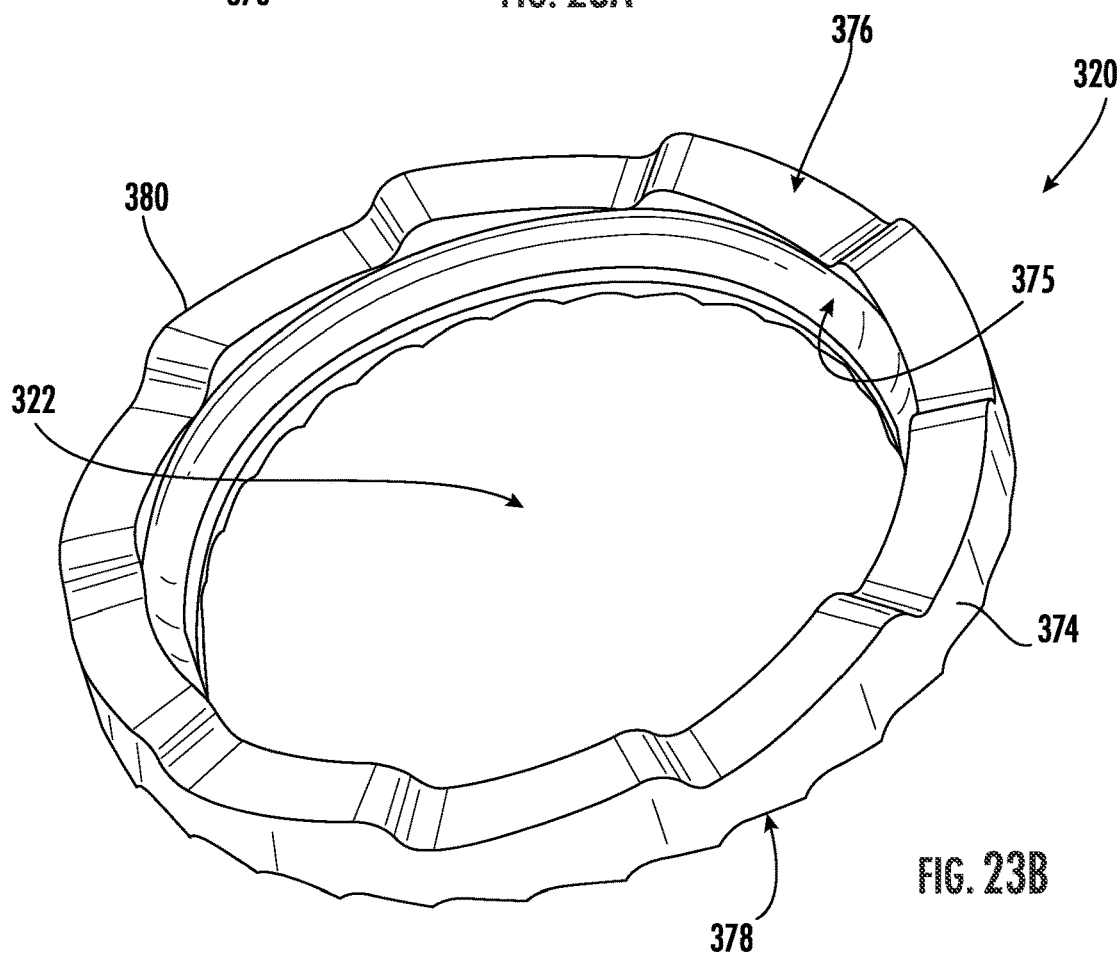
Figure 23C:
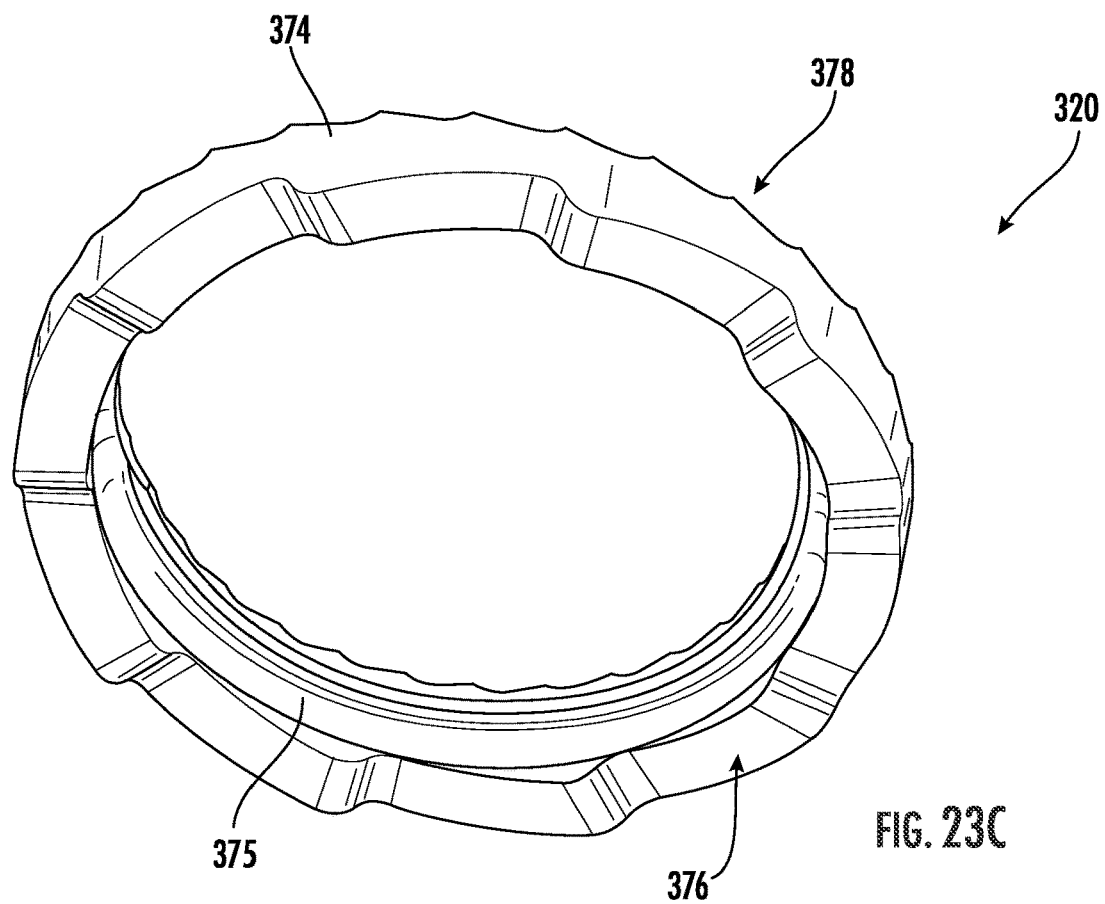
Figure 23D:
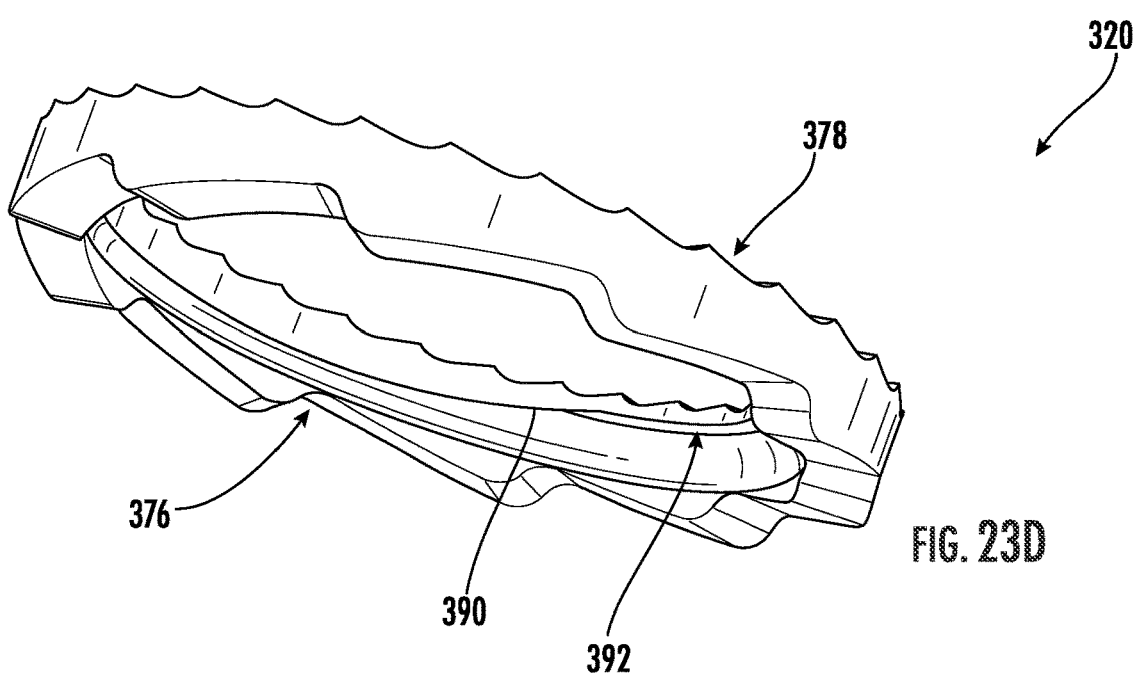

As shown in FIG. 23A, the inner surface 375 of washer 320 includes a shelf 390 that extends around a portion of the perimeter of central opening 322 between upper and lower surfaces 376, 378. Shelf 390 has a height in the longitudinal direction that varies as shelf 390 extends around the perimeter of washer 320. More specifically, the height of shelf 390 reduces around perimeter until it reaches a minimum height in the area 392 of cutout 383. This creates a curved or C-shaped inner surface that extends around only a portion of the perimeter of washer 320. The curved surface gradually reduces to a less-curved surface on the other side of the perimeter from cutout 383 (see also FIG. 23D).

Inner surface 375 of washer 320 may have other configurations. For example, instead of shelf 390, a portion of inner surface 375 may taper inwardly from upper surface 376 to lower surface 378. In this configuration, inner surface 375 curves around the internal perimeter of washer 320 such that on one side of the washer 320, inner surface is substantially parallel to the longitudinal axis of screw 330 and upper and lower surfaces 376, 378 extend the same distance laterally from the longitudinal axis. However, on the other side of the washer 320, inner surface 375 tapers inwardly from upper surface 376 to lower surface 378 such that lower surface 378 extends further away from the longitudinal axis than upper surface 376.

While the screw heads are shown as integrated with their shafts, it is contemplated that the screw heads may also be detachable from the shafts in some embodiments. Further, lower portions of the shank portions may also have various shapes such as a conical or rounded cup shape in some embodiments.

FIGS. 25A-25D illustrate a representative medical implant assembly 400 that includes a spinal implant 410 and one or more fixation assemblies which may have the configuration of any of the embodiments described above. Spinal implant 410 may include anterior and posterior portions 412, 414 and upper and lower surfaces 416, 418 profiled to correspond with the profile of any bone material to which they are to be secured. As shown, the upper and lower surfaces 416, 418 may further include surface enhancements, such as, teeth 440 to enhance bone attachment. It is understood, however, that alternative surface modifications such as surface roughenings, barbs, spikes, bumps, etc. may also be employed. In one embodiment, the spinal implant 410 defines a generally wedge shaped structure. The spinal implant 410, however, may have other shapes depending on the desired implantation site. Further, it is to be understood that the medical implant assembly may include any type of implant having a screw hole for receiving the fixation assembly of the present disclosure, and is in no way limited to fusion cages as illustrated herein.

The spinal implant 410 and its components may be formed of any suitable medical grade material, such as biocompatible metals like stainless steel, titanium, titanium alloys, etc. or a medical grade plastic such as polyetheretherketone (PEEK) or another radiolucent material, ultra high molecular weight polyethylene (UEMWPE), etc. If so desired, the implant 410 may also be formed of a bioresorbable material. The bioresorbable material may preferably be osteoconductive or osteoinductive (or both).

As shown, the spinal implant 410 may include a central opening or lumen 450 extending between the upper and lower surfaces 416, 418 to facilitate bony ingrowth or fusion between adjacent bone segments, such as vertebral bodies. Opening 450 may extend through one or more of the surfaces of implant, such as one or more the side surfaces 452. If so desired, the opening 450 may be used to receive and hold bone graft material.

The spinal implant 410 may include holes (not shown) for placement of the fixation assemblies 300 therethrough to secure the spinal implant 410 to adjacent bone tissue. The fixation assemblies may comprise one of the embodiments described above, or a combination of such embodiments. In the embodiment shown, the implant 410 includes four holes staggered from each other from one side of the implant to the other. One skilled in the art will appreciate that the implant 410 may comprise any number of holes in any location on the implant 410. For instance, a two-hole or three-hole version of the spinal implant 410 may be envisioned. Optionally, the implant 410 may comprise holes for receiving features like a radiologic marker or other imaging marker.

Implant 410 may include a backout plate 490 positioned over the posterior portion 414 of the implant 410. Backout plate 490 serves to prevent backing out of the fixation assembly 300 from the holes of the implant. Of course, one skilled in the art will appreciate that any number of known mechanisms may be used to inhibit or prevent backing out of the fixation assemblies.

This description and the accompanying drawings illustrate exemplary embodiments and should not be taken as limiting, with the claims defining the scope of the present disclosure, including equivalents. Various mechanical, compositional, structural, and operational changes may be made without departing from the scope of this description and the claims, including equivalents. Like numbers in two or more figures represent the same or similar elements. Furthermore, elements and their associated aspects that are described in detail with reference to one embodiment may, whenever practical, be included in other embodiments in which they are not specifically shown or described. For example, if an element is described in detail with reference to one embodiment and is not described with reference to a second

What we claim is:

1. A fixation assembly for an implant, the assembly comprising:
   a screw having a head, a shaft with a threaded portion and a shank portion between the threaded portion and the head;
   a washer having at least one outer surface with one or more frictional elements for engaging a surface of the implant;
   wherein the shaft comprises one or more projections extending from the shank portion, wherein the projections and the shank define a cross-sectional area;
   wherein the washer defines an upper surface facing the head of the screw, a lower surface opposite the upper surface and a central opening extending from the upper surface to the lower surface, wherein the central opening has a cross-sectional area less than the cross-sectional area of the projections and the shank at, or near, the upper surface of the washer; and
   wherein the central opening comprises a cutout region at, or near, the lower surface of the washer such that the central opening has a cross-sectional area greater than the cross-sectional area of the projections and the shank at, or near, the lower surface of the washer.

2. The fixation assembly of claim 1, wherein the central opening has a diameter at, or near, the upper surface of the washer, and the central opening has a first perimeter surface at the cutout and a second perimeter surface on an opposite side of the central opening from the cutout, wherein the distance between the first perimeter surface and the second perimeter surface is greater than the diameter of the central opening at, or near, the upper surface of the washer.

3. The fixation assembly of claim 2, wherein the central opening defines an internal perimeter, wherein the internal perimeter is substantially circular at, or near the upper surface of the washer.

4. The fixation assembly of claim 3, wherein the internal perimeter of the central opening is non-circular at, or near, the lower surface of the washer.

5. The fixation assembly of claim 1, wherein the lower surface has a first portion with a first width and a second portion with a second width, wherein the second width is smaller than the first width.

6. The fixation assembly of claim 1, wherein the washer includes an inner surface around a perimeter of the central opening, the inner surface including a shelf that varies in height around the perimeter from the upper surface to the lower surface.

7. The fixation assembly of claim 1, wherein the washer comprises an inner surface, wherein at least a portion of the inner surface tapers laterally outward from a first portion at, or near, the upper surface to a second portion at, or near, the lower surface.

8. The fixation assembly of claim 1, wherein the projections on the shank comprise one or more threads.

9. The fixation assembly of claim 1, wherein the head has a lower surface facing the shank having a plurality of cams disposed thereon, wherein the washer has a second outer surface that includes a plurality of cams configured to interlock with the cams of the head.

10. The fixation assembly of claim 9, wherein the washer cams have an angle of inclination and the threaded portion of the shank comprises threads having a pitch angle, the angle of inclination being greater than the pitch angle.

11. The fixation assembly of claim 1, wherein the shank includes a tip and the threaded portion of the shank comprises an upper part near the head and a lower part near the tip, wherein the upper part includes threads and the lower part includes threads having a different thread pitch than the threads of the upper part.

12. The fixation assembly of claim 11, wherein the threads of the upper part have a lower thread pitch than the threads of the lower part.

13. The fixation assembly of claim 1, wherein the head and the washer each have an outer dimension, the outer dimension of the head being substantially equal to the outer dimension of the washer.

14. The fixation assembly of claim 1, wherein the threaded portion of the screw is configured to engage a bone of a patient to secure the implant to the bone.

15. A medical implant comprising:
   an implantable body having an upper surface, a lower surface and a through hole;
   a screw having a head and a shaft with a threaded portion; and
   a washer having at least one outer surface with one or more frictional elements for engaging a surface of the implant;
   wherein the shaft comprises one or more projections extending from a shank portion between the threaded portion and the head;
   wherein the washer defines an upper surface facing the head of the screw, a lower surface opposite the upper surface and a central opening extending from the upper surface to the lower surface, wherein the central opening has a cross-sectional area less than the cross-sectional area of the projections and the shank at, or near, the upper surface of the washer; and
   wherein the central opening comprises a cutout region at, or near, the lower surface of the washer such that the central opening has a cross-sectional area greater than the cross-sectional area of the projections and the shank at, or near, the lower surface of the washer.

16. The medical implant of claim 15, wherein the implantable body comprises an outer perimeter surface including an anterior side and an opposite posterior side and an upper surface having a contact area configured for engaging a vertebral body, the implantable body further comprising first and second upwardly projecting apertures that extend through said anterior side.

17. The medical implant of claim 16, further comprising first and second screws configured to extend through the first and second upwardly projecting apertures for engaging the vertebral body and first and second washers each having at least one outer surface with one or more frictional elements for engaging a surface of the vertebral body.

18. The medical implant of claim 17, wherein the implantable body comprises:
   third and fourth downwardly projecting apertures that extend through said anterior side;
   third and fourth screws configured to extend through the third and fourth downwardly projecting apertures for engaging a second vertebral body; and
   third and fourth washers each having at least one outer surface with one or more frictional elements for engaging a surface of the second vertebral body.

19. The medical implant of claim 18, further comprising a locking plate configured to engage the anterior side of the implantable body and secure the screws within the apertures.

20. The medical implant of claim 15, wherein the central opening has a diameter at, or near, the upper surface of the washer, and the central opening has a first perimeter surface at the cutout and a second perimeter surface on an opposite side of the central opening from the cutout, wherein the distance between the first perimeter surface and the second perimeter surface is greater than the diameter of the central opening at, or near, the upper surface of the washer.

21. The medical implant of claim 20, wherein the central opening defines an internal perimeter, wherein the internal perimeter is substantially circular at the upper surface.

22. The medical implant of claim 21, wherein the internal perimeter of the central opening is non-circular at the lower surface.

23. The medical implant of claim 15, wherein the lower surface has a first portion with a first width and a second portion with a second width, wherein the second width is smaller than the first width.

24. The medical implant of claim 15, wherein the projections on the shank comprise one or more threads.

* * * * *